(12) United States Patent
Iseki et al.

(10) Patent No.: US 8,794,696 B2
(45) Date of Patent: Aug. 5, 2014

(54) STRUCTURE FOR FRONT OF VEHICLE BODY

(75) Inventors: Masashige Iseki, Wako (JP); Kosaku Tomozawa, Wako (JP); Manabu Ishizono, Wako (JP); Takeshi Yoshimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/981,399

(22) PCT Filed: Jan. 10, 2012

(86) PCT No.: PCT/JP2012/050231
§ 371 (c)(1),
(2), (4) Date: Sep. 5, 2013

(87) PCT Pub. No.: WO2012/102067
PCT Pub. Date: Aug. 2, 2012

(65) Prior Publication Data
US 2013/0334842 A1    Dec. 19, 2013

(30) Foreign Application Priority Data

Jan. 26, 2011 (JP) ................................. 2011-014047
Jan. 26, 2011 (JP) ................................. 2011-014071

(51) Int. Cl.
*B62D 25/20* (2006.01)
(52) U.S. Cl.
USPC ......... 296/204; 296/70; 296/209; 296/203.02
(58) Field of Classification Search
USPC .......... 296/205, 193.09, 203.02, 193.01, 204, 296/70, 209
See application file for complete search history.

(56) References Cited

U.S. PATENT DOCUMENTS

| | | | | |
|---|---|---|---|---|
| 7,469,957 B1* | 12/2008 | Boettcher | ................ | 296/193.07 |
| 7,597,386 B2* | 10/2009 | Egawa et al. | ............ | 296/193.07 |
| 7,699,385 B2* | 4/2010 | Kurata | ........................ | 296/204 |
| 2003/0025359 A1* | 2/2003 | Takahashi et al. | ........ | 296/203.02 |
| 2009/0096253 A1* | 4/2009 | Yatsuda | ................... | 296/193.09 |
| 2010/0171340 A1* | 7/2010 | Yasuhara et al. | ............. | 296/205 |
| 2012/0242113 A1* | 9/2012 | Yasuhara et al. | ......... | 296/193.07 |

FOREIGN PATENT DOCUMENTS

| | | |
|---|---|---|
| JP | 05-270435 | 10/1993 |
| JP | 06-219333 | 8/1994 |
| JP | 2001-219873 | 8/2001 |
| JP | 2009-018724 | 1/2009 |
| JP | 4325351 | 6/2009 |

* cited by examiner

*Primary Examiner* — Pinel Romain
(74) *Attorney, Agent, or Firm* — Rankin, Hill & Clark LLP

(57) ABSTRACT

A structure for the front of a vehicle body includes front side frames. The front side frames have bend portions in the rear portion thereof, the bend portions sloping downwards along a dashboard lower panel as the front side frames extend towards the back of the vehicle body. Side sill-side extensions curve to the side of side sills from the end parts of the bend portions. Curving tunnel-side extensions curve towards a tunnel portion. The side sill-side extensions and the tunnel-side extensions form branched portions branching at substantially the same angle. Triangular load support portions are formed at the back of the branched portions between the side sill-side extensions and the tunnel-side extensions. Rear end support portions for supporting the rear ends of sub frames are provided to the bend portions and the fronts of the load support portions.

15 Claims, 22 Drawing Sheets

STRUCTURE FOR FRONT OF VEHICLE BODY

TECHNICAL FIELD

The present invention relates to structures for a front of a vehicle body, i.e. front vehicle body structures, which include: left and right front side frames extending in a front-rear direction of the vehicle body; a lower dashboard panel provided to partition between an engine room and a passenger compartment; and side sills provided rearward of the lower dashboard panel and extending in the front-rear direction of the vehicle body.

BACKGROUND ART

Front vehicle body structures of the aforementioned type are known as disclosed in Patent Literature 1. In the front vehicle body structure disclosed in Patent Literature 1, each of the front side frames includes a bend portion (slanting portion) bent along the lower dashboard panel, a sub frame mount bracket and a plate member are mounted on the bend portion, and a nut member for mounting a sub frame (chassis frame) is supported by the sub frame mount bracket and the plate member.

According to the front vehicle body structure disclosed in Patent Literature 1, when a predetermined load has been input to the sub frame, the nut member is detached and dropped off the front side frame, so that the sub frame can be detached and dropped off the front side frame.

In the front vehicle body structure disclosed in Patent Literature 1, the nut member for mounting the sub frame is supported by the sub frame mount bracket and the plate member, and the sub frame is detached and dropped off the sub frame when a load of more than a predetermined level has been input to the sub frame. Therefore, when a frontal collision load has acted on the front side frames, this front vehicle body structure cannot cause the sub frame to generate a reactive force against the frontal collision force so as to buckle and deform the front side frames. As a consequence, absorption of impact energy of the frontal collision load tends to be insufficient.

PRIOR ART LITERATURE

Patent Literature 1: Japanese Patent No. 4325351

SUMMARY OF INVENTION

Technical Problem

It is therefore an object of the present invention to provide a front vehicle body structure which allows the front side frames to sufficiently buckle and deform so that an amount of absorption, by the front side frames, of impact energy can be increased. It is another object of the present invention to provide a front vehicle body structure which can not only disperse a load from the front side frames to side sills and a tunnel portion but also achieve an increased efficiency of load transmission from the side sills to the tunnel portion.

Solution to Problem

According to the present invention, there is provided a front vehicle body structure, which comprises: a front side frame extending in a front-rear direction of the vehicle body; a lower dashboard panel provided on a rear portion of the front side frame and partitioning between an engine room and a passenger compartment; a sub frame supported by the front side frame; a side sill extending in the front-rear direction of the vehicle body along a side edge of a floor panel provided behind the lower dashboard panel; and a tunnel portion provided on a milled region, in a vehicle width direction, of the floor panel and extending from the lower dashboard panel in the front-rear direction of the vehicle body, the front side frame having, in a rear region thereof, a bend portion sloping downward, along the lower dashboard panel, in a direction toward the rear of the vehicle body, the bend portion having, in a rear region thereof, a branch portion where a side-sill-side extension curved toward the side sill and a tunnel-side extension bent toward the tunnel portion are branched at substantially equal angles, a load support portion of a triangular shape being formed behind the branch portion and between the side-sill-side extension and the tunnel-side extension, a rear end support portion being provided on the bend portion in front of the load support portion for supporting a rear end of the sub frame.

Preferably, the front vehicle body structure, further comprises: a sub frame mount bracket provided on the branch portion for supporting the sub frame; and a stiffener provided to extend from the bend portion to the branch portion in such a manner that, when a frontal collision load has acted on the front sub frame from a front of the vehicle body, the stiffener suppresses bending of the bend portion, and that, when a lateral collision load has acted on the front side frame from a lateral side of the vehicle body, the stiffener transmits the lateral collision load to the tunnel-side extension. Upper and lower portions of a collar nut, to which a fastening member of the sub frame is joined, are supported by the sub frame mount bracket and the stiffener.

Preferably, the stiffener includes: a front portion joined to a bottom of the bend portion; and a rear portion joined to a flange of the tunnel-side extension via a flange of the side-sill-side extension.

Preferably, the stiffener has a longitudinal bead formed on and along a middle region thereof.

Preferably, the side sill is joined to an outrigger extending from the branch portion outward in the vehicle width direction.

Preferably, a peripheral region of the branch portion has a greater sectional area than each of the bend portion, the side-sill-side extension and the tunnel-side extension of the front side frame.

Preferably, the front side frame has a curve portion curved from an outer side toward an inner side thereof in the vehicle width direction, and the curve portion includes a reinforcing member provided thereon to extend from front to rear thereof, and the stiffener is disposed in opposed relation to the reinforcing member.

Preferably, the branch portion includes an outrigger extending outward in the vehicle width direction while the front vehicle body structure further comprises a stiffener provided to extend from the bend portion to the branch portion in such that, when a frontal collision load has acted on the front sub frame from a front of the vehicle body, the stiffener suppresses bending of the bend portion, and such that, when a lateral collision load has acted on the front side frame from a lateral side of the vehicle body, the stiffener transmits the lateral collision load to the outrigger and the tunnel-side extension.

Preferably, the branch portion has the load support portion of a triangular shape formed behind the branch portion and between the side-sill-side extension and the tunnel-side extension.

Preferably, the stiffener has a stepped portion connecting to a rear wall of the outrigger and to a rear wall of the load support portion.

Preferably, the tunnel portion includes: a center tunnel formed by a central region of the floor panel being protruded upward toward the passenger compartment; tunnel frames provided, on left and right sides of the center tunnel and extending in the front-rear direction of the vehicle body; and a tunnel cross member connecting between front ends of the tunnel frames or between rear ends of the tunnel-side extensions provided on left and right sides of the vehicle body.

Preferably, the stiffener has: a front portion joined to a bottom of the bend portion; and a rear portion joined to a flange of the tunnel-side extension via a flange of the side-sill-side extension.

Preferably, the stiffener has a longitudinal bead formed on and along a middle region thereof.

Preferably, the side sill is joined to an outrigger extending from the branch portion outward in the vehicle width direction.

Preferably, the peripheral region of the branch portion has a greater sectional area than each of the bend portion, the side-sill-side extension and the tunnel-side extension of the front side frame.

Preferably, the front side frame has a curve portion curved from an outer side to an inner side thereof in the vehicle width direction, and the curve portion includes a reinforcing member provided thereon to extend from front to rear thereof, and the stiffener is disposed in opposed relation to the reinforcing member.

Advantageous Effects of Invention

In the present invention, the front side frames has, on its rear region, the bend portion sloping downward, along the lower dashboard panel, in the direction toward the rear of the vehicle body. A rear end part of the bend portion constitute the branch portion where the side-sill-side extension having a closed section bent continuously toward the side sill and the tunnel-side extension bent from an inner wall of the closed section toward the tunnel portion branch at generally equal angles. Thus, at the time of occurrence of a frontal collision, a collision load applied from the side frame can be transmitted preferentially to the side sill formed, for example, of a high-strength steel plate. Such arrangements can reduce a need for reinforcing structures beneath the floor panel and allows the input load to be dispersed to the tunnel portion as well.

Further, the triangular load support portion connecting between the side-sill-side extension and the tunnel-side extension is formed behind the branch portion, and the rear end support portion supporting the rear end of the sub frame is provided on the bend portion in front of the load support portion. Such arrangements allow the load support portion to receive a frontal collision load and to promote a directional change of the load to the side-sill-side extension and the tunnel-side extension such that the load can be transmitted along the respective axes of the side-sill-side extension and tunnel-side extension. Further, because the rear end support portion supporting the rear end of the sub frame is provided in front of the load support portion, the sub frame can be supported firmly. As a result, when a frontal collision load has acted on the front side frame from the front of the vehicle body, the branch portion and the load support portion can receive the frontal collision load, so that the sub frame is caused to generate a reactive force sufficiently buckle and deform to permit an increased amount of energy absorption by the front side frame. If the sub frame has a high strength and rigidity, buckling and deformation of the front side frame can be promoted to effectively absorb impact energy by causing stress to concentrate on the rear end support portion so that a fastening member (fastening bolt) is broken or pulled out of the vehicle body to cause detachment of the sub frame. Thus, even with a small-size vehicle, which has a relatively wide passenger compartment with the engine room disposed in front of the passenger compartment reduced in its front-rear length, the front vehicle body structure of the present invention can achieve a sufficient collision performance.

Further, the upper and lower portions of the collar nut, to which the fastening member of the sub frame is joined, are supported by the sub frame mount bracket and the stiffener. Thus, a load applied from the front side frame can be dispersed, via the stiffener, uniformly to the side sill and the tunnel portion.

Further, the front portion of the stiffener is joined to the bottom of the bend portion, and the rear portion of the stiffener is joined to the flange of the tunnel-side extension via the flange of the side-sill-side extension. A load from the front side frame and a load from the sub frame can be readily dispersed to the side-sill-side extension and the tunnel-side extension.

Further, the stiffener has the longitudinal bead formed on and along the middle region thereof. The stiffener can not only prevent bending of the bend portion of the front side frame but also disperse a load in the front-rear direction of the front side frame.

Further, the outrigger extending from the branch portion outward in the vehicle width direction is joined to the side sill. Thus, when a lateral collision load has acted from a lateral side of the vehicle body, the lateral collision load can be dispersed from the side sill to the branch portion via the outrigger. Further, because the outrigger extending from the branch portion outward in the vehicle width direction is joined to the side sill, the present invention can increase a supported strength of the sub frame.

Further, the peripheral region of the branch portion has a greater sectional area than each of the bend portion, the side-sill-side extension and the tunnel-side extension of the front side frame. Thus, the present invention can increase a load bearing strength of the branch portion. Thus, when a frontal collision load has acted on the front side frame from the front of the vehicle body, the present invention can also suppress bending of the rear bend portion (kick-down portion) of the front side frame.

Further, the front side frame has the curve portion extending in the front-to-rear direction while being curved from the outer side toward the inner side as viewed in plan, and the curve portion includes the reinforcing member provided thereon to extend from front to rear thereof with the stiffener disposed in opposed relation to the reinforcing member. Thus, when a frontal collision load has acted from the front of the vehicle body, the present invention can transmit the frontal collision load to the side sill while suppressing bending of the curve portion due to the frontal collision load. In this way, the present invention can achieve an increased load transmission efficiency of the front side frame.

Further, the front vehicle body structure of the present invention further comprises the stiffener provided to extend from the bend portion to the branch portion in such a manner that, when a frontal collision load has acted on the front sub frame from the front of the vehicle body, the stiffener suppresses bending of the bend portion, and that, when a lateral collision load has acted on the front side frame from a lateral side of the vehicle body, the stiffener transmits the lateral collision load to the outrigger and the tunnel-side extension.

Thus, the present invention can suppress bending of a rear portion of the front side frame and transmit a lateral collision load to the outrigger and the tunnel-side extension. Further, in the case where the tunnel portion comprises tunnel frames and a tunnel cross member, the load can be dispersedly transmitted to the tunnel frames and the tunnel cross member.

Furthermore, the branch portion has the triangular load support portion formed behind the branch portion and between the side-sill-side extension and the tunnel-side extension. Thus, a frontal collision load can be dispersedly transmitted via the triangular load support portion to the tunnel portion (tunnel frames and tunnel cross member).

Furthermore, the stiffener has the stepped portion connecting to the rear wall of the outrigger and to the rear wall of the load support portion. Via such a stepped portion connecting to the rear wall of the outrigger and rear wall of the load support portion, the present invention permits even more efficient dispersed transmission of a load to the tunnel portion (tunnel frames and tunnel cross member).

Furthermore, the tunnel portion includes: the center tunnel formed by the central region of the floor panel being protruded upward toward the passenger compartment; the tunnel frames provided on left and right sides of the center tunnel and extending in the front-rear direction of the vehicle body; and the tunnel cross member connecting between the front ends of the tunnel frames or between the rear ends of the tunnel-side extensions provided on the left and right sides of the vehicle body. Thus, the present invention can dispersedly transmit a load applied from the tunnel-side extension from one of the left and right sides of the vehicle body to the other side of the vehicle body.

Furthermore, the front portion of the stiffener is joined to the bottom of the bend portion, and the rear portion of the stiffener is joined to the flange of the tunnel-side extension via the flange of the side-sill-side extension. Thus, the present invention allows a load from the front side frame to be readily dispersed to the side-sill-side extension and the tunnel-side extension.

Furthermore, the stiffener has the longitudinal bead formed on and along the middle region thereof. The stiffener can not only prevent bending of the bend portion of the front side frame but also disperse a load in the front-rear direction of the front side frame.

Furthermore, the outrigger extending from the branch portion outward in the vehicle width direction is joined to the side sill. Thus, when a lateral collision load has acted from a lateral side of the vehicle body, the lateral collision load can be dispersed from the side sill to the branch portion via the outrigger. Further, because the outrigger extending from the branch portion outward in the vehicle width direction is joined to the side sill, the present invention can increase a supported strength of the sub frame.

Furthermore, the peripheral region of the branch portion has a greater sectional area than each of the bend portion, the side-sill-side extension and the tunnel-side extension of the front side frame. Thus, the present invention can increase a load bearing strength of the branch portion. Thus, when a frontal collision load has acted on the front side frame from the front of the vehicle body, the present invention can also suppress bending of the rear bend portion (kick-down portion) of the front side frame.

Furthermore, the front side frame has the curve portion extending in the front-to-rear direction while being curved from the outer side toward the inner side as viewed in plan, and the curve portion includes the reinforcing member provided thereon to extend from front to rear thereof with the stiffener disposed in opposed relation to the reinforcing member. Thus, when a frontal collision load has acted from the front of the vehicle body, the present invention can transmit the frontal collision load to the side sill while suppressing bending of the curve portion due to the frontal collision load. In this way, the present invention can achieve an increased load transmission efficiency of the front side frame.

DESCRIPTION OF EMBODIMENTS

Figure 1:
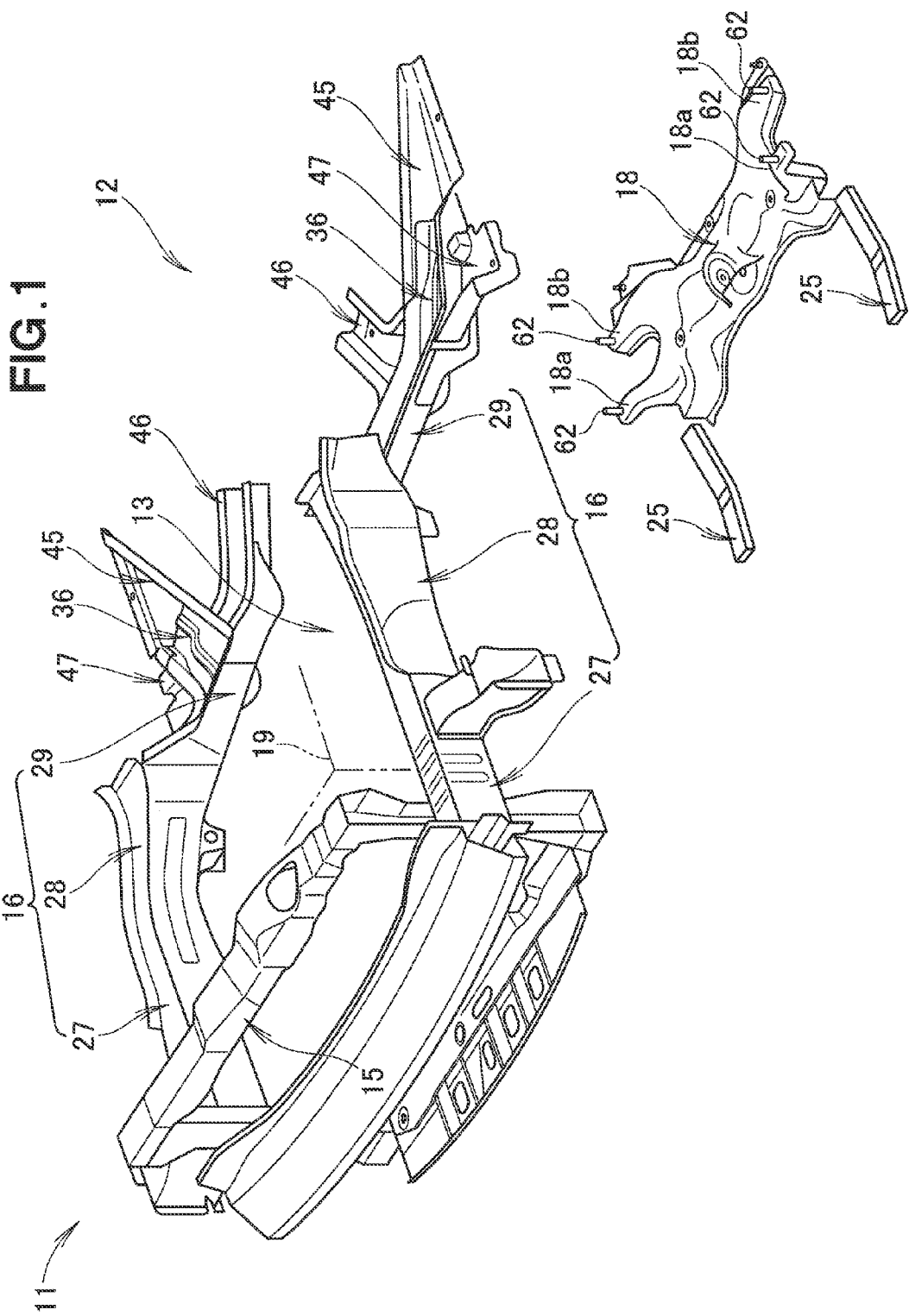
FIG. 1 is an exploded perspective view showing an embodiment of a front vehicle body structure of the present invention.

Embodiments of the present invention will be described hereinbelow with reference to the accompanying drawings.

Embodiments

As shown in FIGS. 1 to 8, an embodiment of a front vehicle body structure of the present invention includes: a front bulkhead 15 provided in a front region of a vehicle body 11; front side frames 16 each extending from the front bulkhead 15 toward the rear of the vehicle body; damper houses 17 each provided on a longitudinally middle part of a corresponding one of the front side frames 16 and located outward, in a vehicle width direction, of the corresponding front side frame 16; a sub frame (front sub frame) 18 supported by the front side frames 16; a lower dashboard panel 21 (FIG. 4) provided on rear portions of the front side frames 16 for partitioning between an engine room 13 and a passenger compartment 12; a floor panel 22 (FIG. 4) provided rearward of the lower dashboard panel 21; side sills 23 provided rearward of the lower dashboard panel 21 and laterally outward of the floor panel 22 and extending in a front-rear direction of the vehicle body; and a tunnel portion 24 provided rearward of the lower dashboard panel 21 and on a middle region, in the vehicle width direction, of the floor panel 22 and extending in the front-rear direction of the vehicle body.

Figure 15:
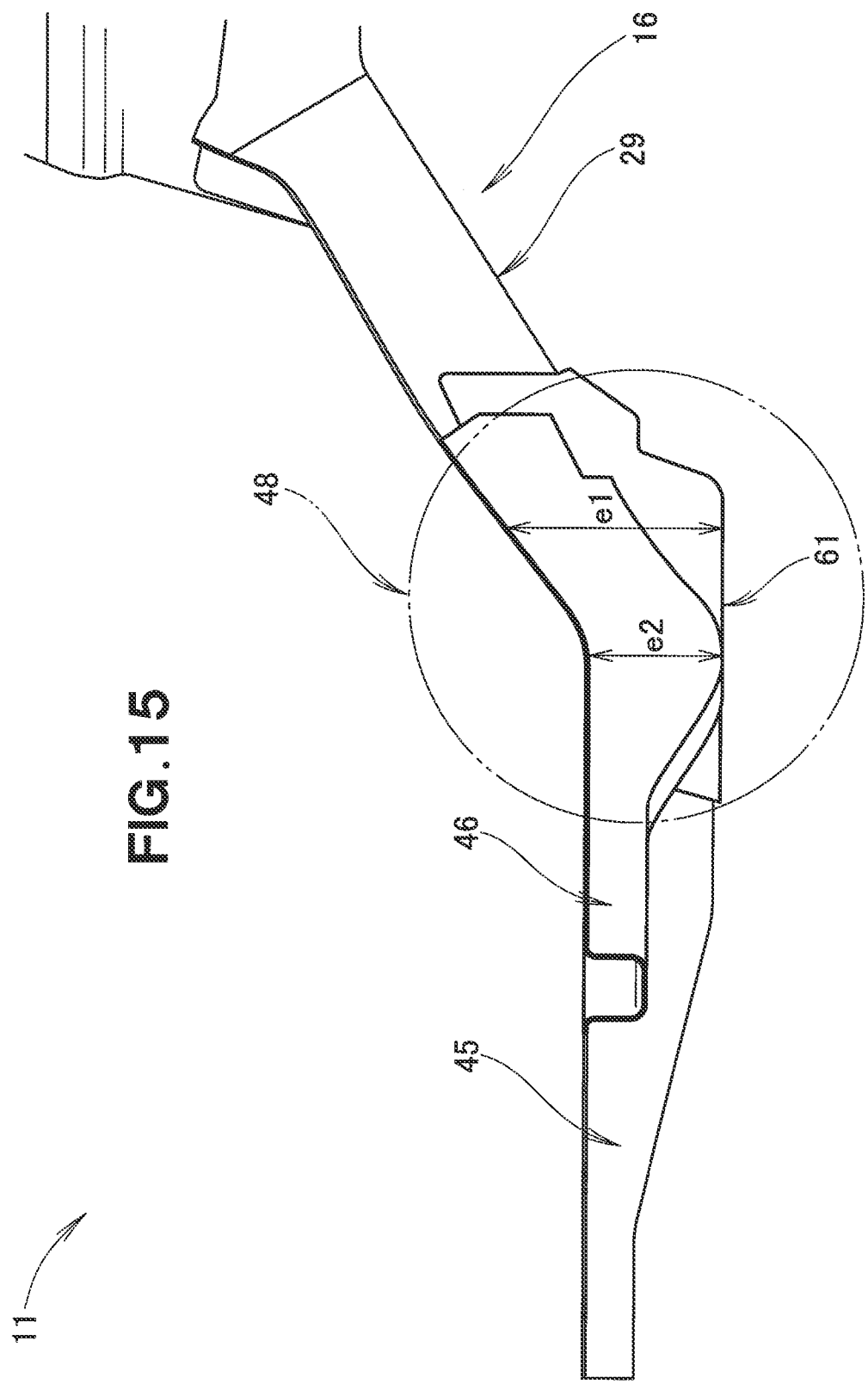
FIG. 15 is a side view of the branch portion shown in FIG. 11.
Figure 16:
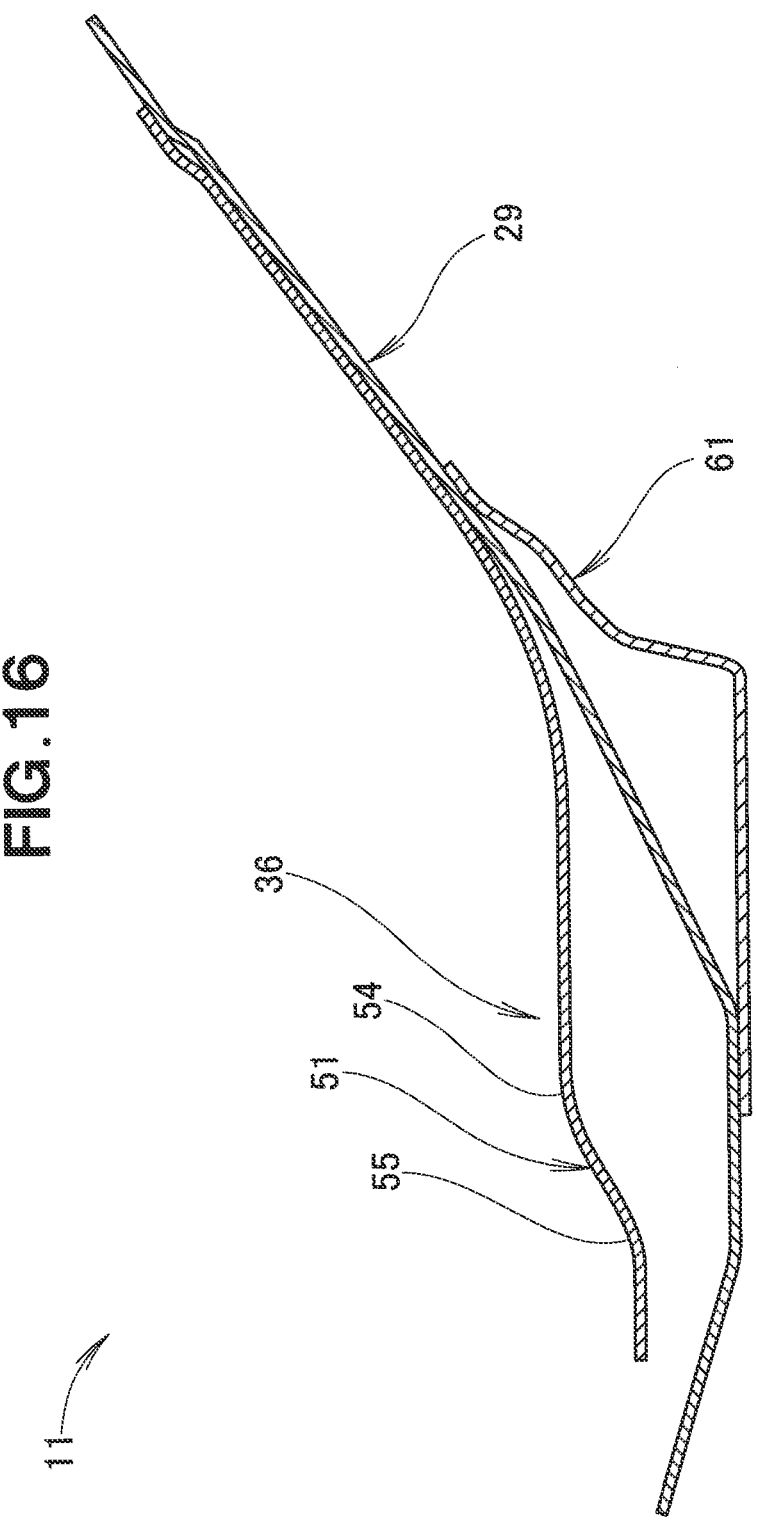
FIG. 16 is a sectional view taken along line 16-16 of FIG. 12.
Figure 17:
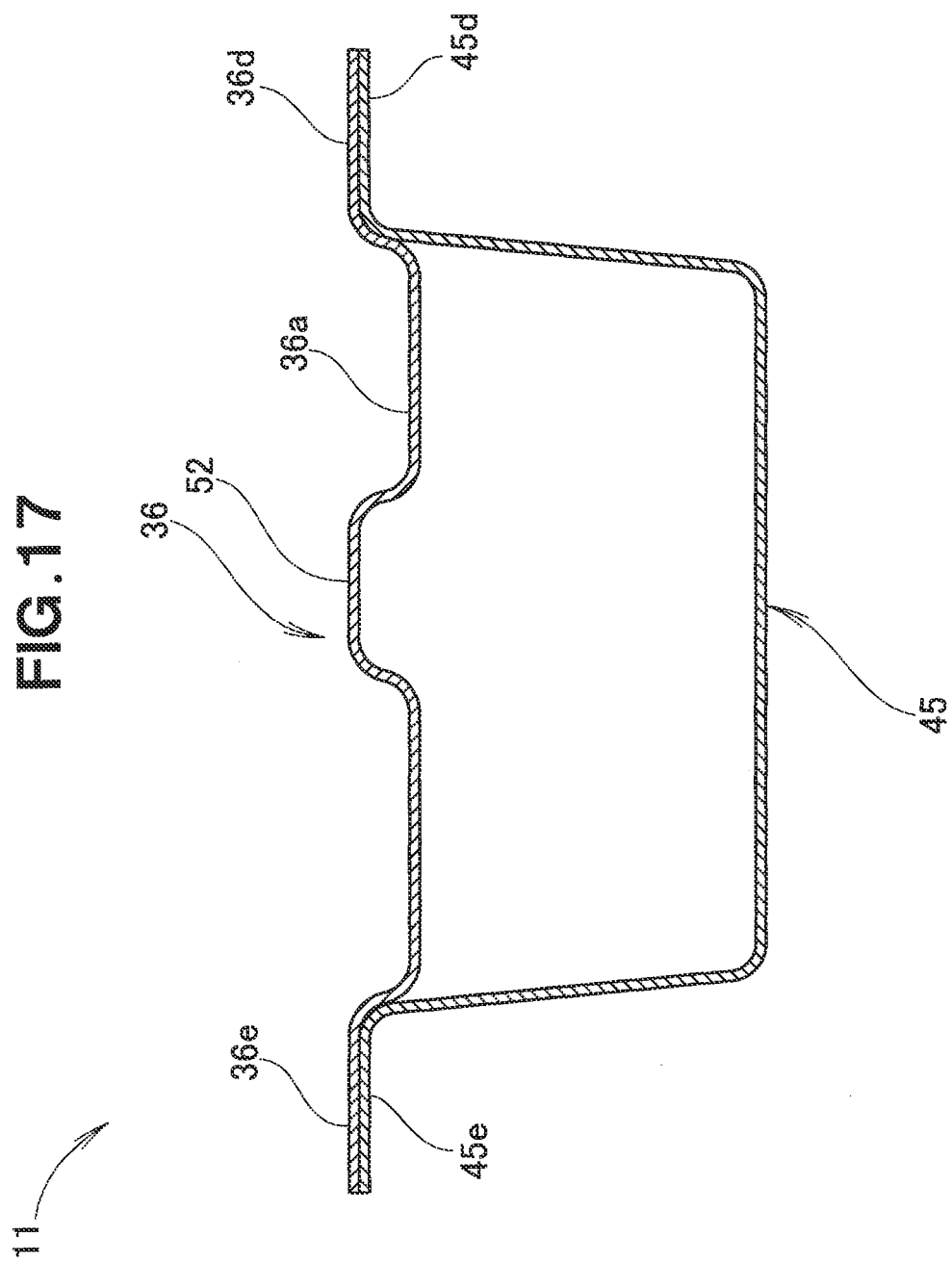
FIG. 17 is a sectional view taken along line 17-17 of FIG. 12.
Figure 20:
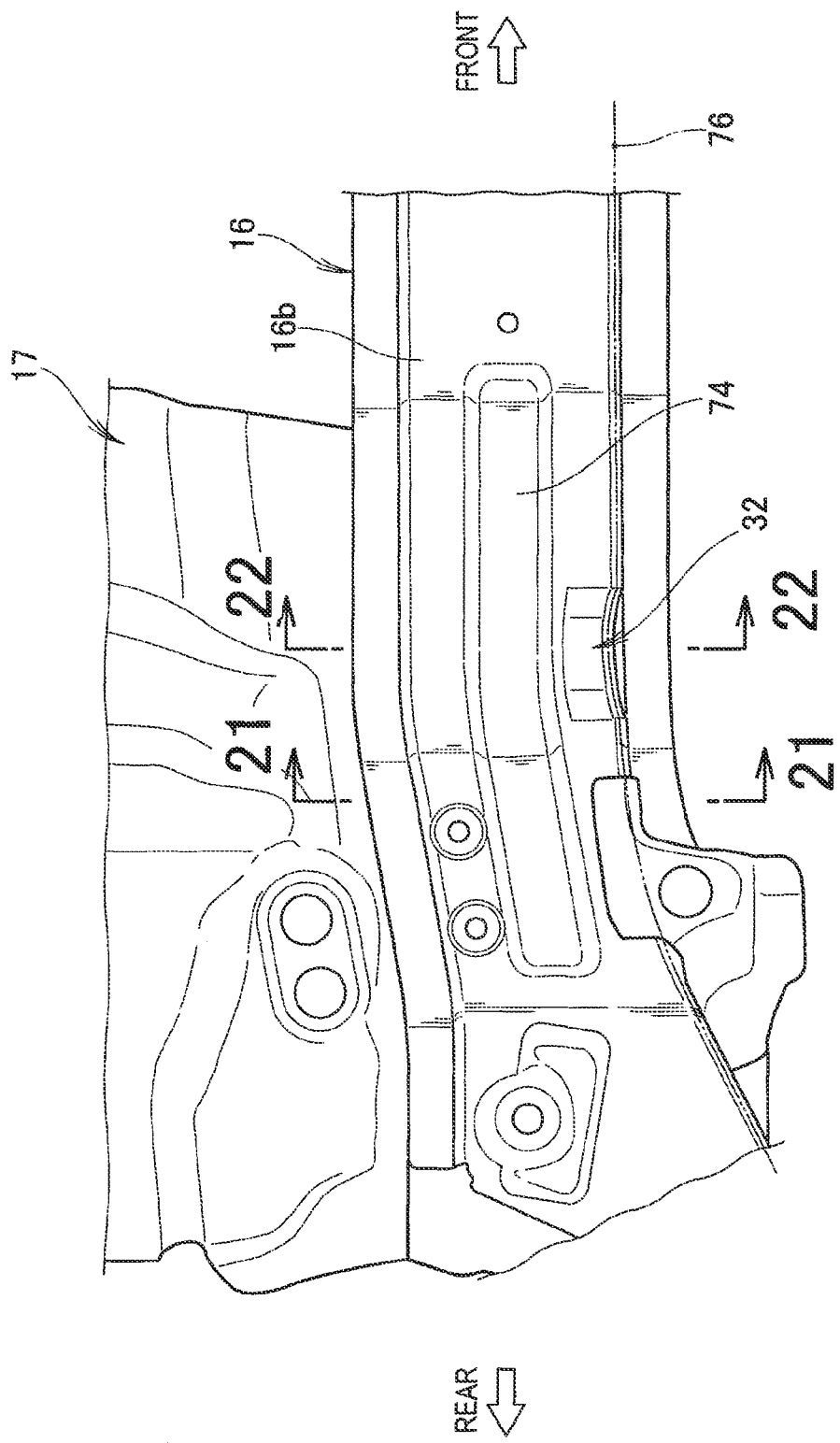
FIG. 20 is a side view showing a deformation facilitating portion of the front side of FIG. 19, as taken from a central region of the vehicle body.
Figure 21:
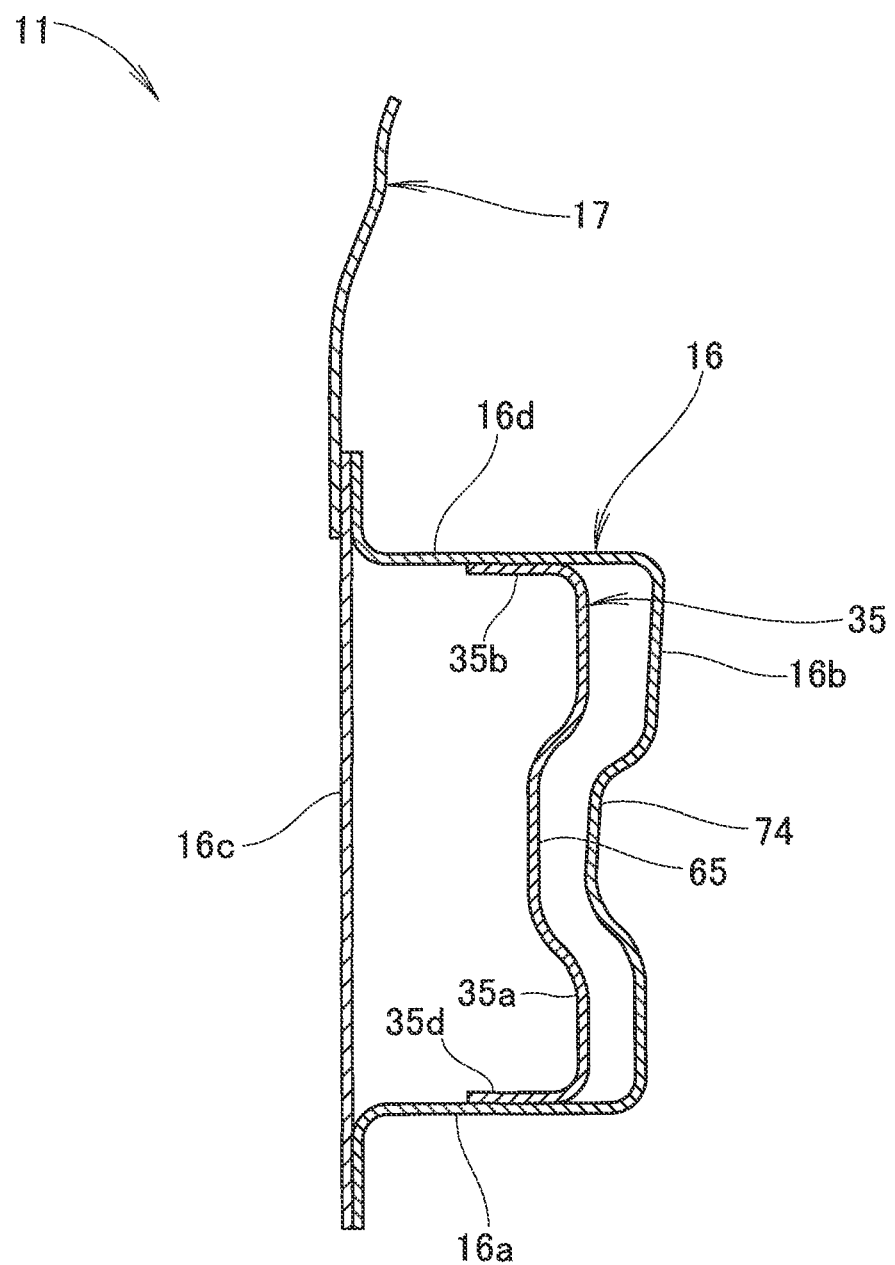
FIG. 21 is a sectional view taken along line 21-21 of FIG. 20.
Figure 22:
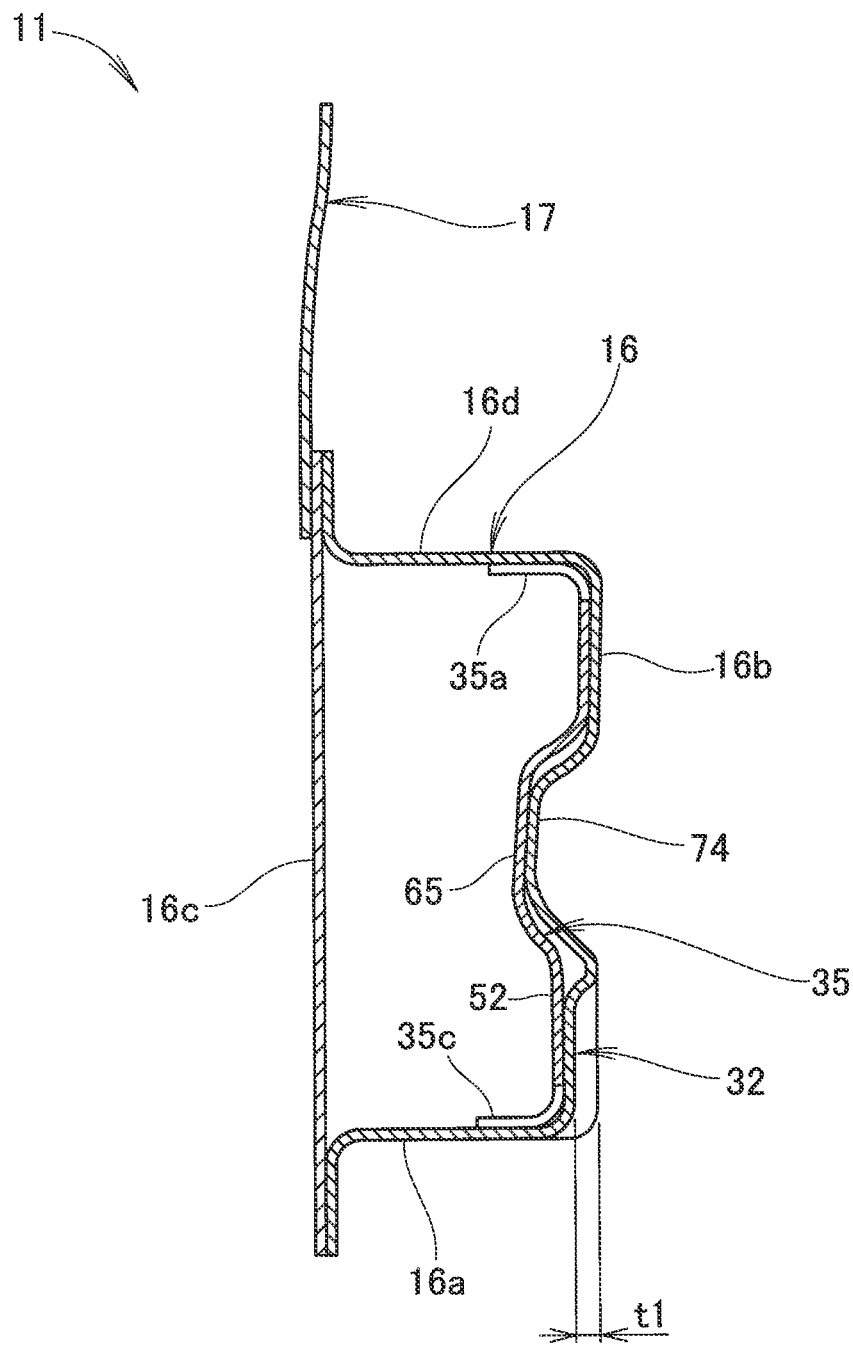
FIG. 22 is a sectional view taken along line 22-22 of FIG. 20.

Each of the front side frames 16 includes: a front straight portion 27 extending straight in the front-rear direction of the vehicle body; a middle curve portion 28 curved in the vehicle width direction; and a rear bend portion 29 sloping straight downward toward the rear of the vehicle body (see FIG. 15). As shown in FIGS. 21 and 22, the front side frame 16 is a member having a rectangular closed section defined with a bottom wall 16a, an inner wall 16b, an outer wall 16c and a ceiling portion 16d. As shown in FIGS. 20 to 22, a front-frame-side bead 74 is formed on the inner wall 16b along a bead 65 of a reinforcing member 35.

The sub frame 18 is joined to the front bulkhead 15 via load path members 25. Thus, when a frontal collision load has acted from the front of the vehicle body, smooth load transmission is permitted.

Figure 3:
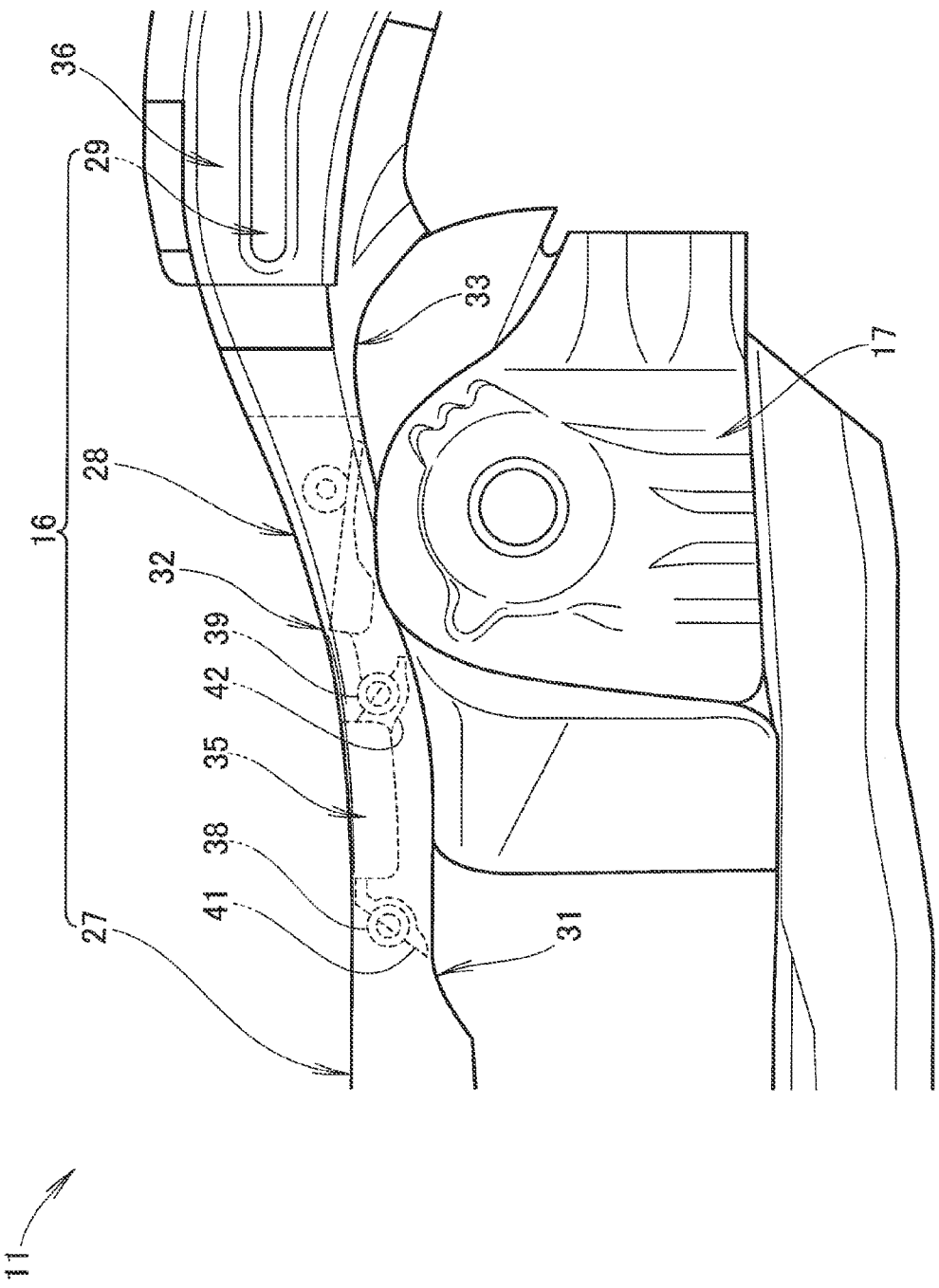
FIG. 3 is a plan view of a front side frame shown in FIG. 2.

As shown in FIG. 3, the curve portion 28 has three recessed portions (first to third recessed portions) 31 to 33, which, when a frontal collision load has acted on the front side frame 16 from the front of the vehicle body, allow the frontal collision load to concentrate thereon and thereby permit bending of the front side frame 16.

The first recessed portion 31 is a recess for permitting inward bending of the front side frame 16. The second recessed portion (deformation facilitating portion) 32 (FIG. 22) is a recess for permitting outward bending of the front side frame 16 as will be described later. The third recessed portion 31 is also a recess for permitting inward bending of the front side frame 16.

Further, as shown in FIG. 3, the reinforcing member (inner stiffener) 35 is provided between the first to third recessed portions 31 to 33. First and second nut members 38 and 39 for supporting a power unit 91 (FIG. 1) are provided between the first recessed portion 31 and the second recessed portion 32. The power unit 19 comprises an engine, transmission, etc.

Figure 9:
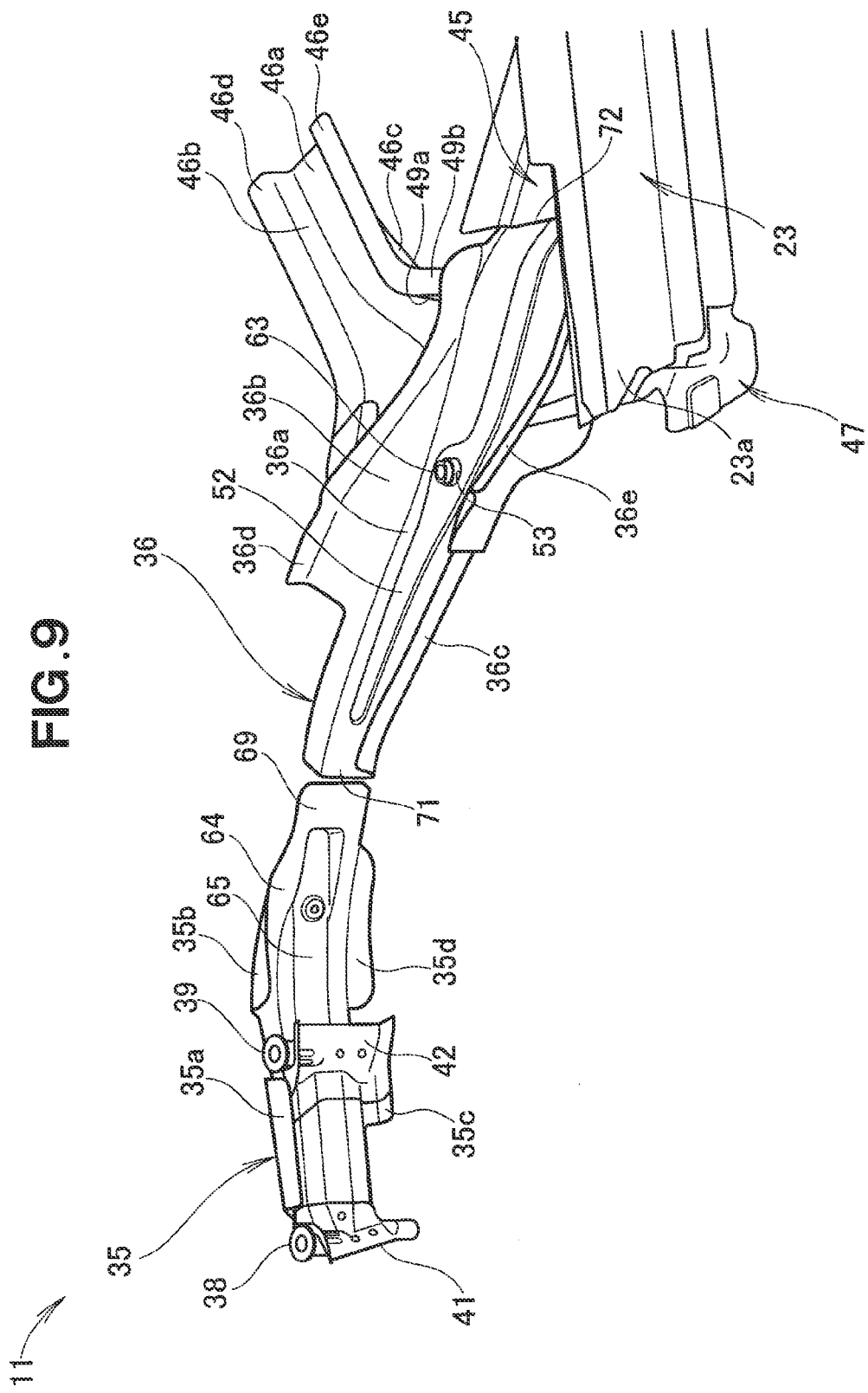
FIG. 9 is a perspective view showing a stiffener and a reinforcing member shown in FIG. 2.
Figure 10:
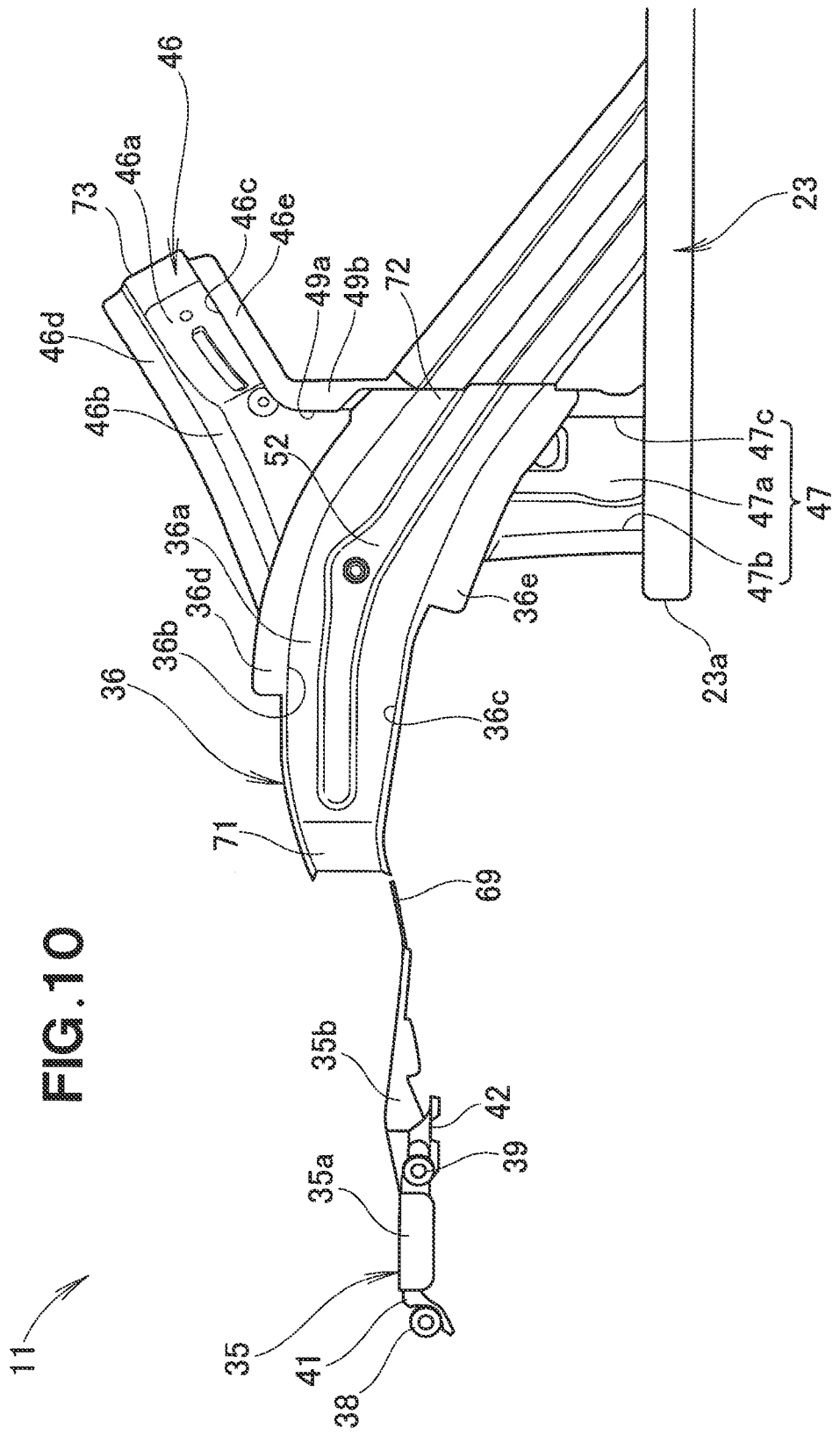
FIG. 10 is a plan view showing the stiffener and the reinforcing member shown in FIG. 2.
Figure 11:
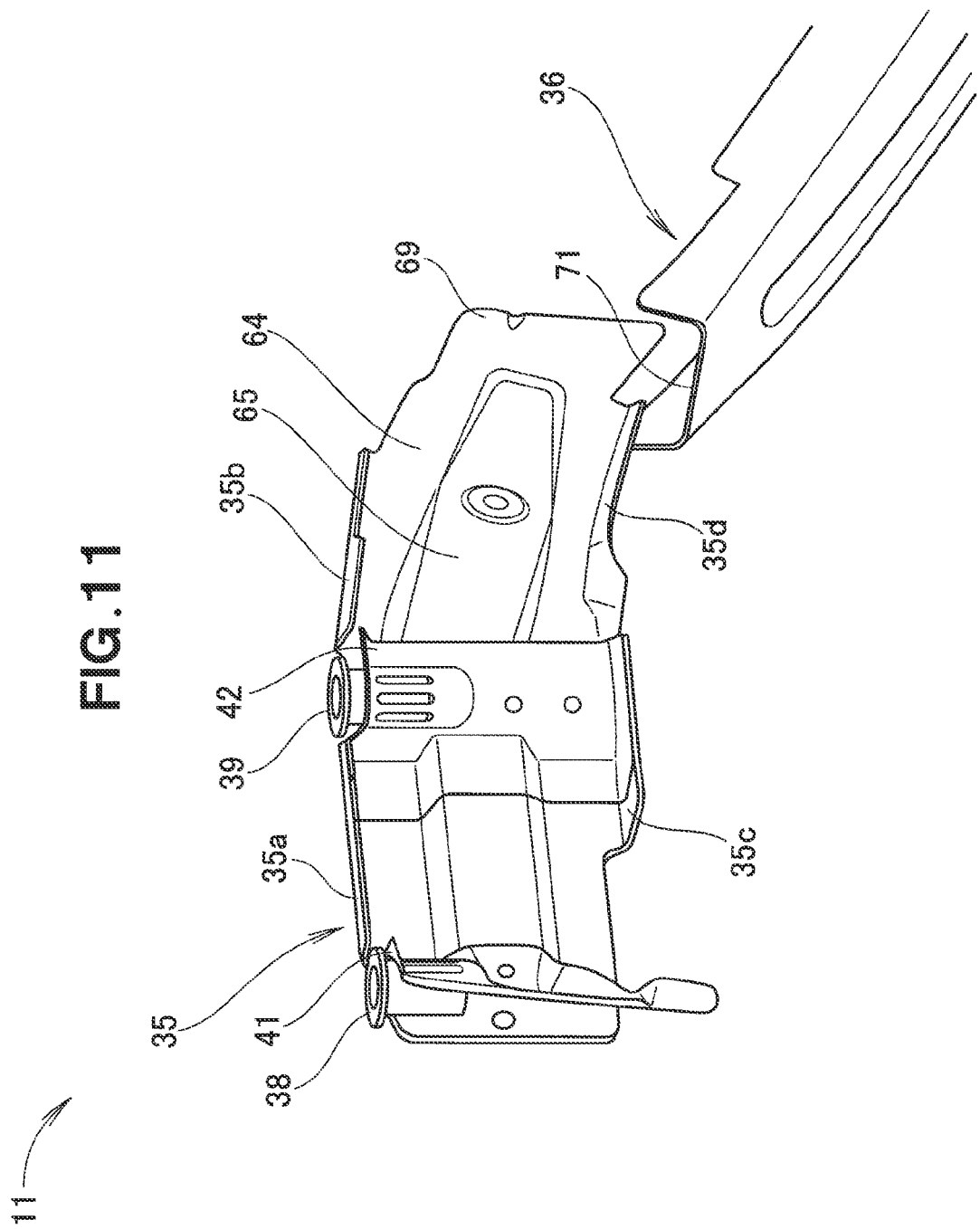
FIG. 11 is a perspective view showing the reinforcing member shown in FIG. 9.

Further, as shown in FIGS. 9 to 11, the first nut member 38 is supported by the outer wall 16c (FIG. 2) of the front side frame 16 via a first bulkhead 41 and supported by the inner wall 16b (FIG. 2) via the reinforcing member 35. The second nut member 39 is supported by the outer wall 16c via a second bulkhead 42 and supported by the inner wall 16b via the reinforcing member 35.

Namely, support portions of the first and second nut members 38 and 39 are reinforced with the reinforcing member 35, but also the first and second bulkheads 41 and 42 extend longitudinally through the interior of the front side frame 16 to thereby partition the interior of the front side frame 16, so that a supporting strength of the first and second nut members 38 and 39 can be increased. In this manner, the power unit (engine, transmission, etc.) 19 of a heavy weight can be supported firmly.

Figure 4:
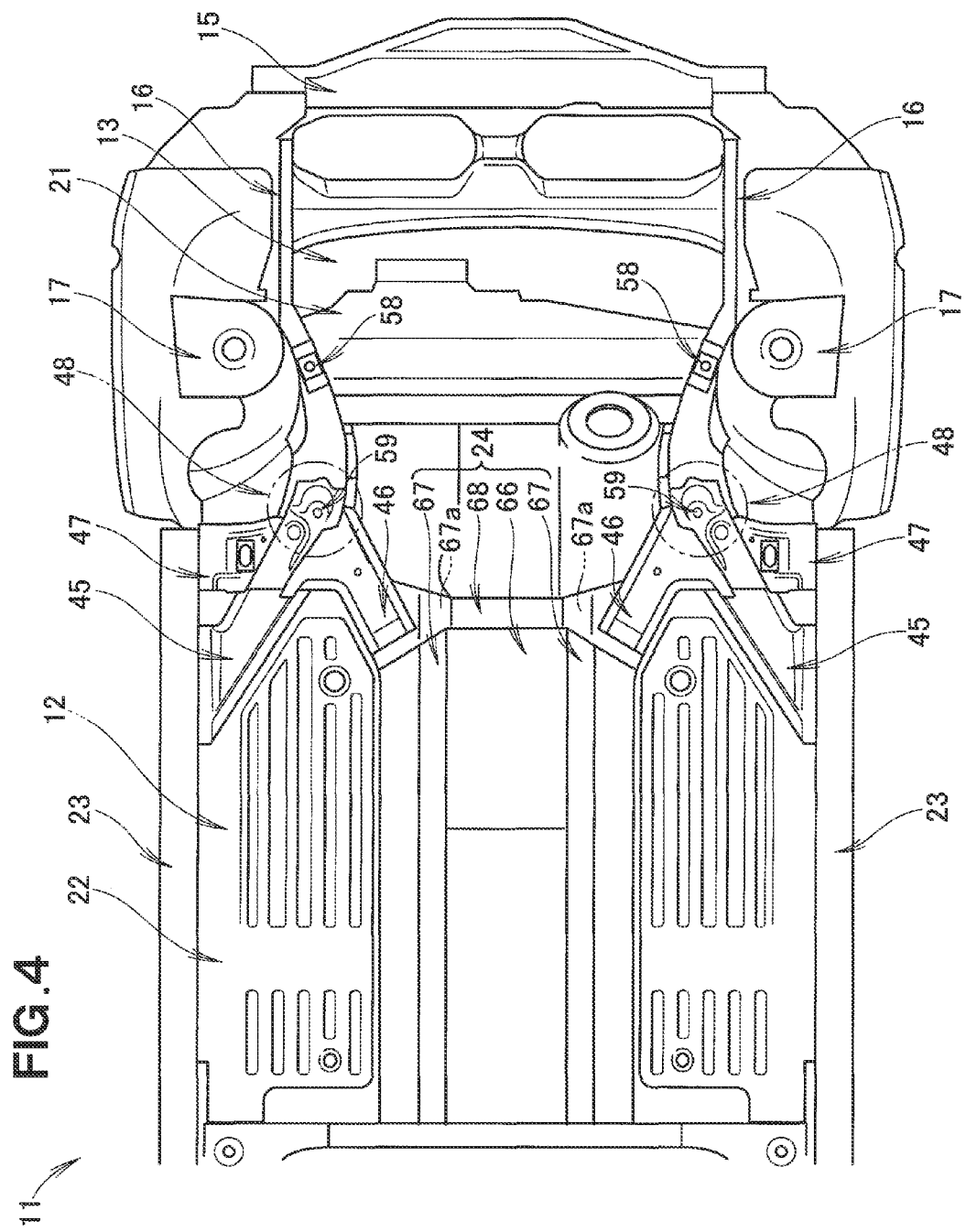
FIG. 4 is a bottom view showing the whole of the front vehicle body structure shown in FIG. 1.

Further, as shown in FIGS. 1 and 12 to 16, each of the front side frames 16 includes the rear bend portion 29. As shown in FIG. 4, the rear bend portion 29 branches into a side-sill-side extension 45 bent from a rear end part 29a (FIG. 8) of the bend portion 29 toward the side sill 23 and a tunnel-side extension 46 bent from the rear end part 29a of the bend portion 29 toward the tunnel portion 24 (FIG. 4). The bend portion 29 slopes downward, along the lower dashboard panel 21 (FIG. 4), in a direction toward the rear of the vehicle body, and the rear end part 29a extends horizontally.

Namely, the front side frame 16 includes the side-sill-side extension 45 (FIG. 4) bent toward the side sill 23 and the tunnel-side extension 46 (FIG. 4) branching at generally the same angle as the side-sill-side extension 45 and oriented toward the tunnel portion 24 (FIG. 4).

More specifically, in FIG. 8, an extension line extending in the front-rear direction of the vehicle body through a rear end support portion 59 of a later-described branch portion 48 is represented by C1, an extension line extending in a longitudinal axis direction of the side-sill-side extension 45 is represented by C2, an extension line extending in a longitudinal axis direction of the tunnel-side extension 46 is represented by C3, an angle defined between the extension line C1 and the extension line C2 is represented by $\theta 1$, and an angle defined between the extension line C1 and the extension line C3 is represented by $\theta 2$. in this case, the angle $\theta 1$ and the angle $\theta 2$ are equal to each other, which are preferably 30° ±10° in view of a load transmitting efficiency. The branch portion 48 is a bent portion where bending starts at the side-sill-side extension 45.

Figure 12:
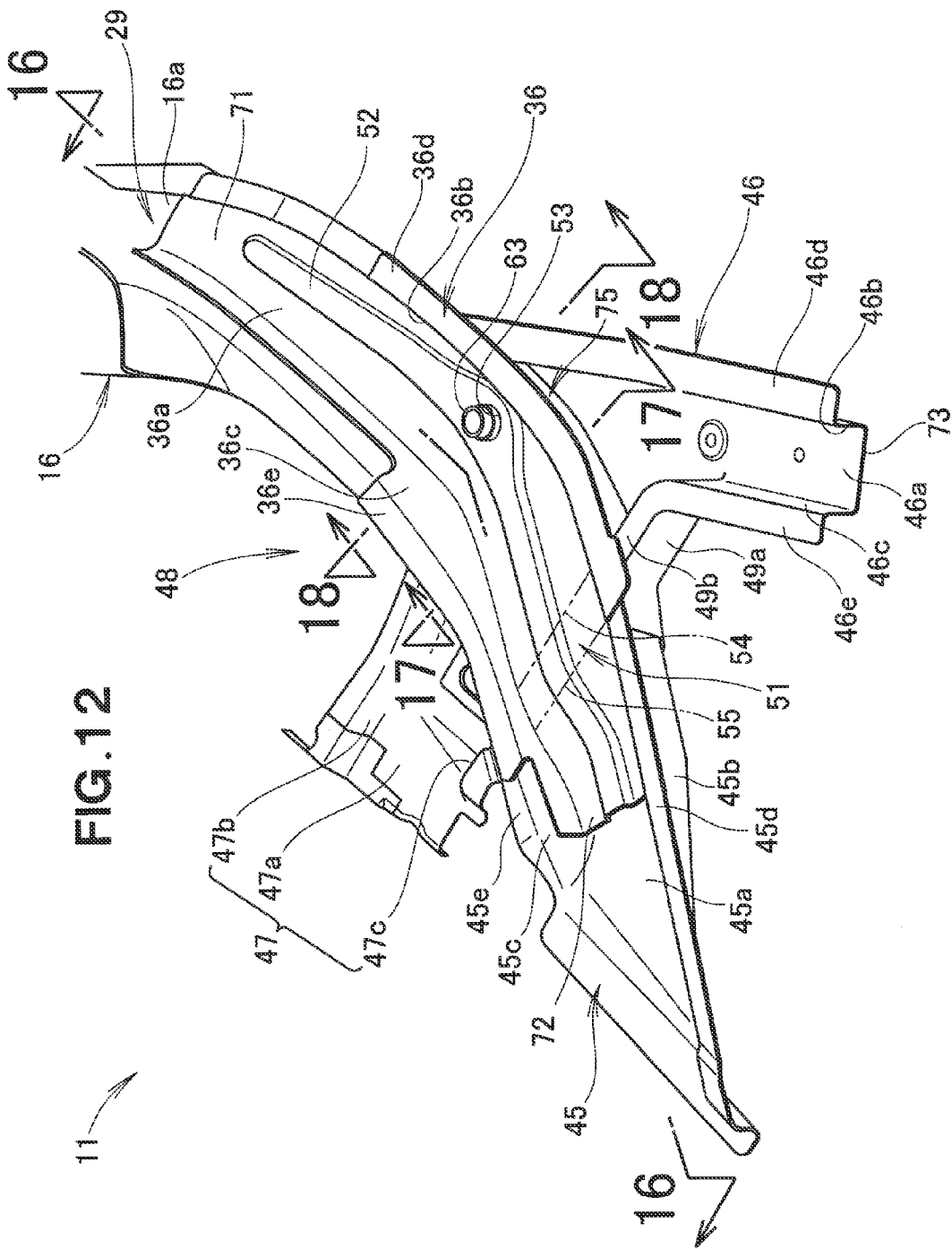
FIG. 12 is a perspective view showing a branch portion of FIG. 8, as taken from the rear of the vehicle body.
Figure 13:
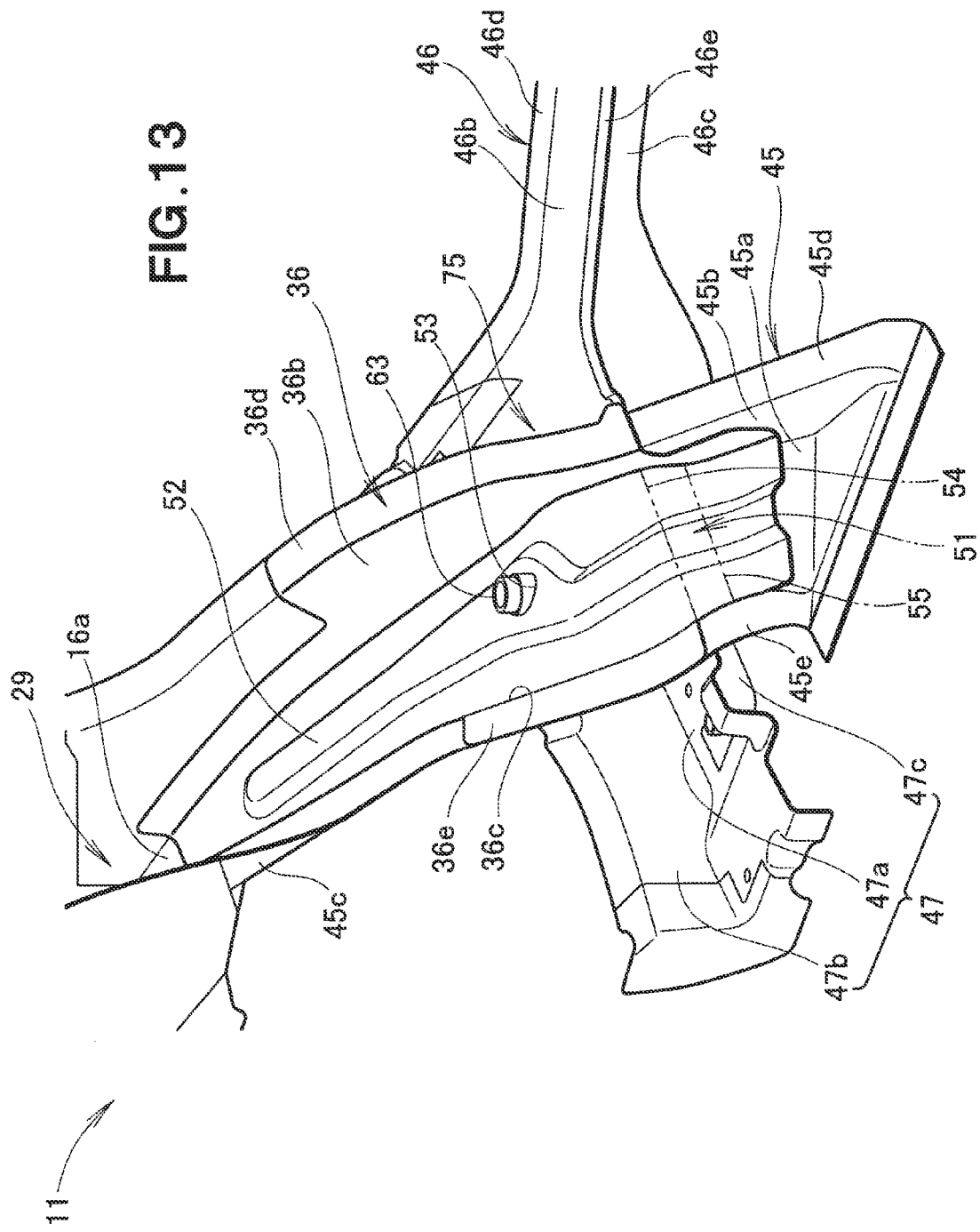
FIG. 13 is a perspective view showing the branch portion of FIG. 12, as taken from a lateral side of the vehicle body.

As shown in FIGS. 12 and 13, a stiffener (reinforcing member) 36 is provided to extend from the bend portion 29 to the branch portion 48. The stiffener 36 serves to not only suppress bending of the bend portion 29 when a frontal collision load has acted on the front side frame 16 from the front of the vehicle body 11, but also transmit a lateral collision load to an outrigger 47 and the tunnel-side extension 46 when the lateral collision load has acted on the front side frame 16 from a lateral side of the vehicle body. As shown in FIGS. 9 to 11, the stiffener 36 is disposed in confronting or opposed relation to the later-described reinforcing member 35.

As shown in FIGS. 12 and 13, the stiffener 36 includes: a bottom surface 36a (FIGS. 2 and 9) facing the bottom 16a of the bend portion 29 (front side frame 16); inner and outer walls 36b and 36c projecting upward from the bottom surface 36a; and flanges 36d and 36e provided on the inner and outer walls 36b and 36c, respectively.

The stiffener 36 has on its bottom surface 36a (FIG. 12): a stepped portion 51 extending in the vehicle width direction to connect to a rear wall 47c of the outrigger 47 and rear wall 49a (FIG. 12) of a load support portion 49 (FIG. 14); a longitudinal bead (raised bead) 52 provided on a middle region, in the vehicle width direction, of the stiffener and extending in a longitudinal direction of the bottom surface 36a; and a support hole 53 supporting an upper portion of a later-described collar nut 63. As shown in FIGS. 12, 13 and, 16, the stepped portion 51 has an upper ridgeline 54 and a lower ridgeline 55 that contribute transmission of a lateral collision load.

Further, the stiffener 36 is joined (spot-welded) at its front portion 71 (FIG. 9) to the bottom 16a, inner wall 16b (FIG. 2) and outer wall 16c of the bend portion 29 (front side frame 16). Further, at a rear portion 72 (FIG. 12) of the stiffer 36, the flanges 36d and 36e are joined to flanges 46d and 46e of the tunnel-side extension 46 via flanges 45d and 45e of the side-sill-side extension 45.

Figure 8:
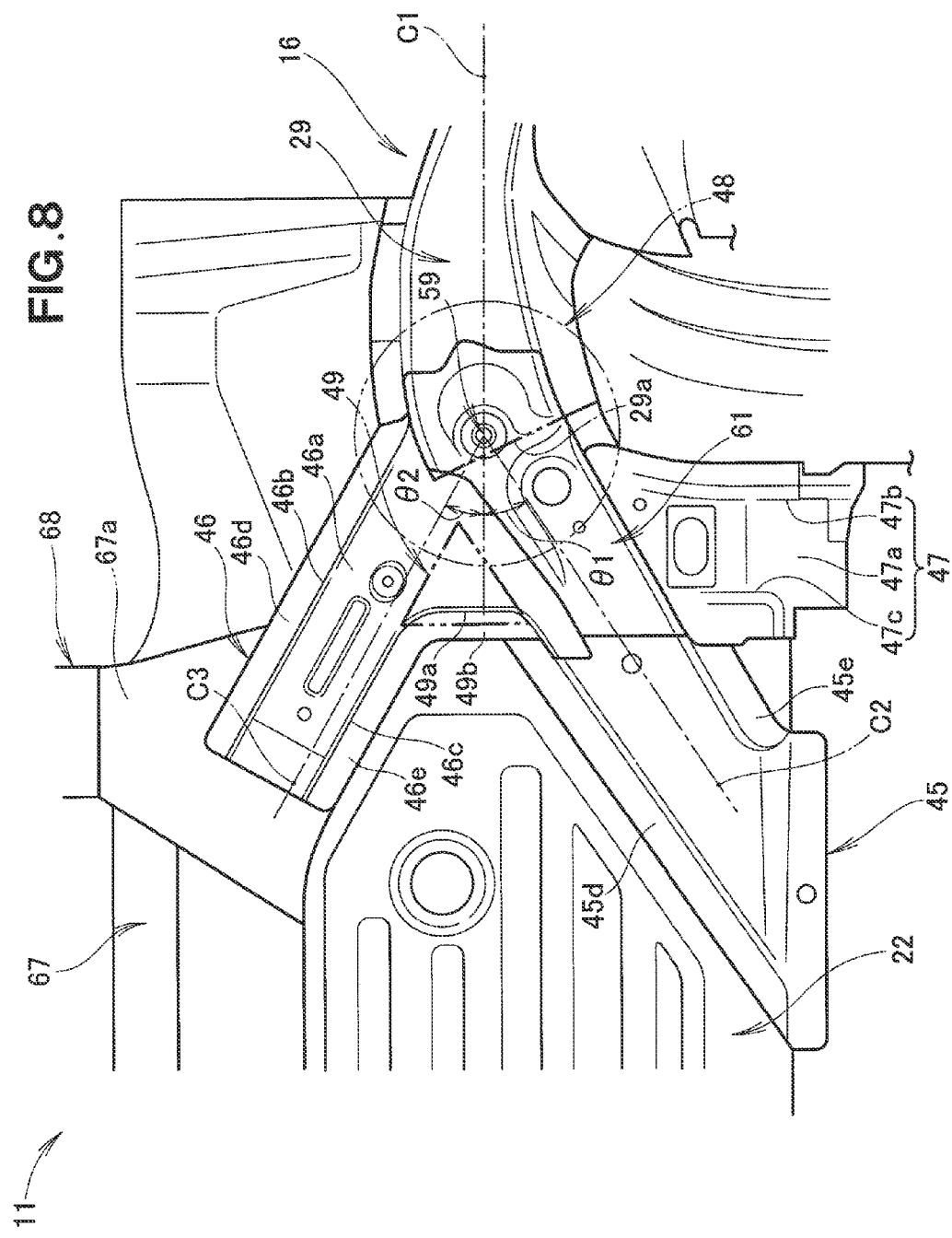
FIG. 8 is a bottom view showing in enlarged scale a right side section of the front vehicle body structure shown in FIG. 4.
Figure 14:
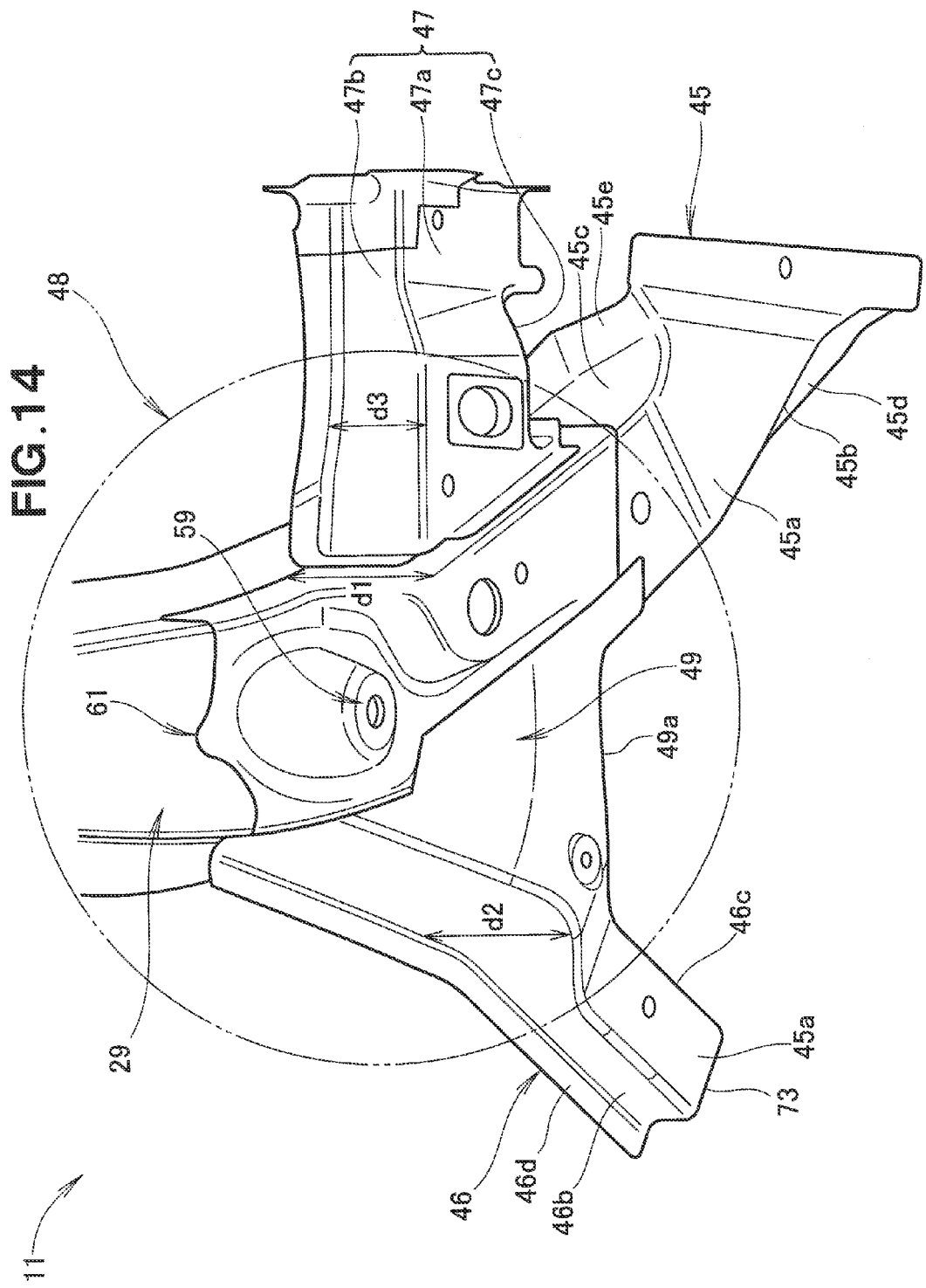
FIG. 14 is a perspective view showing the branch portion of FIG. 13, as taken from below the vehicle body.

As shown in FIGS. 8 and 14, a part where the bend portion 29, the side-sill-side extension 45 and the tunnel-side extension 46 meet one another is the branch portion 48 where the side-sill-side extension 45 and the tunnel-side extension 46 branch. The outrigger 47 extends laterally outward in the vehicle width direction from the branch portion 59 to be joined to the side sill 23 (FIG. 4). The bend portion 29, the side-sill-side extension 45, the tunnel-side extension 46 and the branch portion 59 of the front side frame 16 have substantially equal widths as viewed in rear elevation.

In the branch portion 48, as shown in FIG. 14, the side-sill-side extension 45 and a sub frame mount bracket 61 define a total depth d1, the tunnel-side extension 46 has a depth d2, and the outrigger 47 has a depth d3. Further, in FIG. 15, the total depth defined by the side-sill-side extension 45 and the sub frame mount bracket 61 is represented by e1 and the depth of the tunnel-side extension 46 is represented by e2, where d1=e1 and d2=e2.

Namely, the branch portion 48 has a deeper (or higher) section than the other portions, i.e. the bend portion 29, outrigger 47, side-sill-side extension 45 and tunnel-side extension 46.

Thus, a peripheral region of the branch portion 48 has a greater sectional area than each of the bend portion 29, side-sill-side extension 45 and tunnel-side extension 46. In other words, in the branch portion 48, each of the frame portions, i.e. the bend portion 29, outrigger 47, side-sill-side extension 45 and tunnel-side extension 46, has an increased sectional depth so as to achieve an increased intensity and rigidity.

Figure 5:
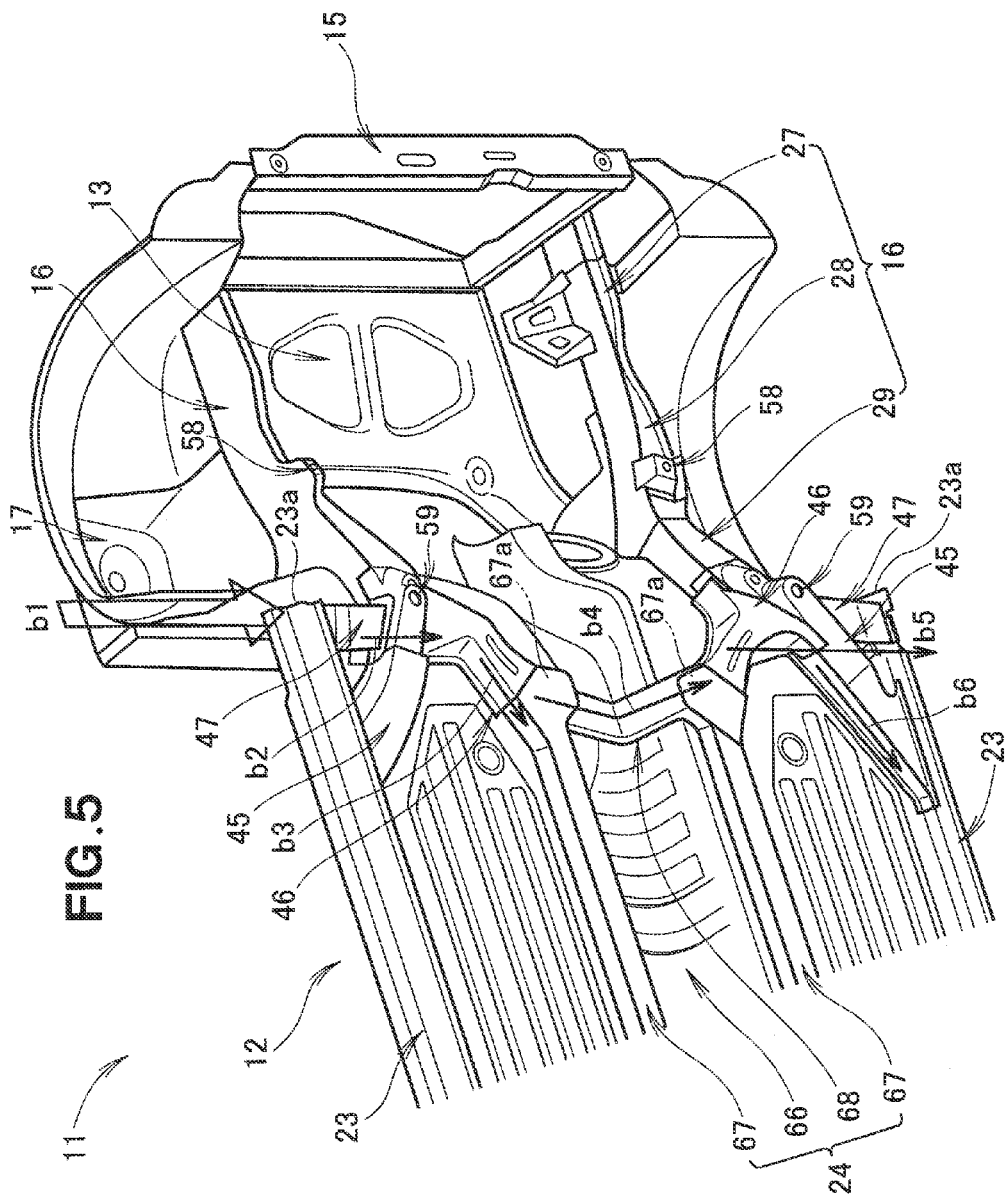
FIG. 5 is a perspective view of the front vehicle body structure shown in FIG. 4.

Further, as shown in FIGS. 6, 12, 17 and 18, the side-sill-side extension 45, which is formed integrally with the bend portion 29 of the front side frame 16, slantingly extends from the rear end part 29a (FIG. 8) of the bend portion 29 toward the side sill 23 and is joined to the side sill 23 behind the outrigger 47 (see FIG. 5).

The side-sill-side extension 45, which is a member of a U sectional shape, includes: a bottom portion 45a; an inner wall projecting upward from the bottom portion 45a; an outer wall 45c projecting upward from the bottom portion 45a; the inner flange 45d provided on the inner wall 45b; and the outer flange 45e provided on the outer wall 45c. An inner-wall-side joint section 75 is where the tunnel-side extension 46 is joined to the side-sill-side extension 45.

The tunnel-side extension 46 includes: a bottom portion 46a; an inner wall 46b projecting upward from the bottom portion 46a; an outer wall 46c projecting upward from the bottom portion 46a; the inner flange 46d provided on the inner wall 46b; the outer flange 46e provided on the outer wall 46c; and a rear flange 49b provided integrally with the outer flange 46e.

Figure 6:
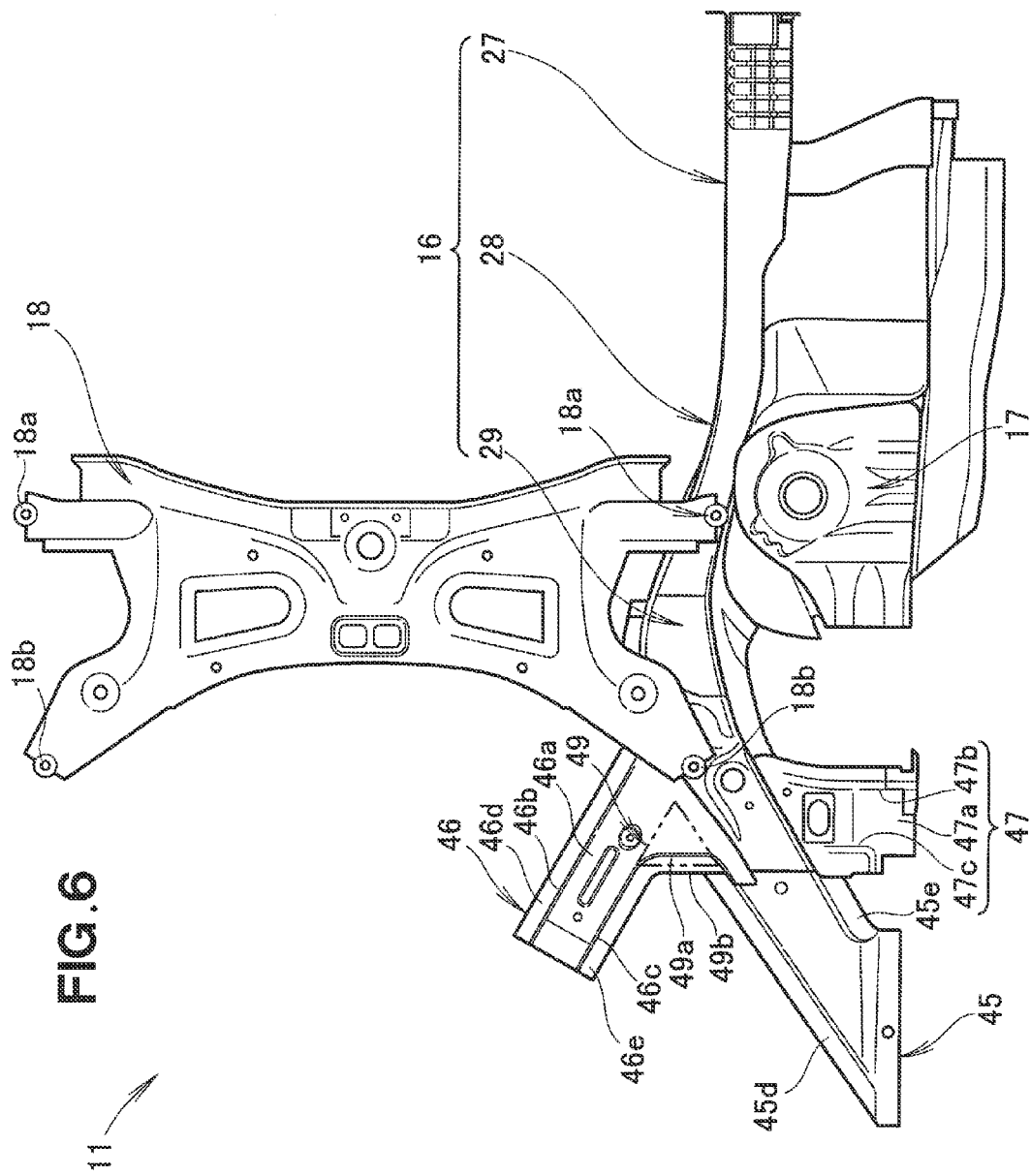
FIG. 6 is a bottom view showing a sub frame of FIG. 1 mounted on the front sub frame.
Figure 7:
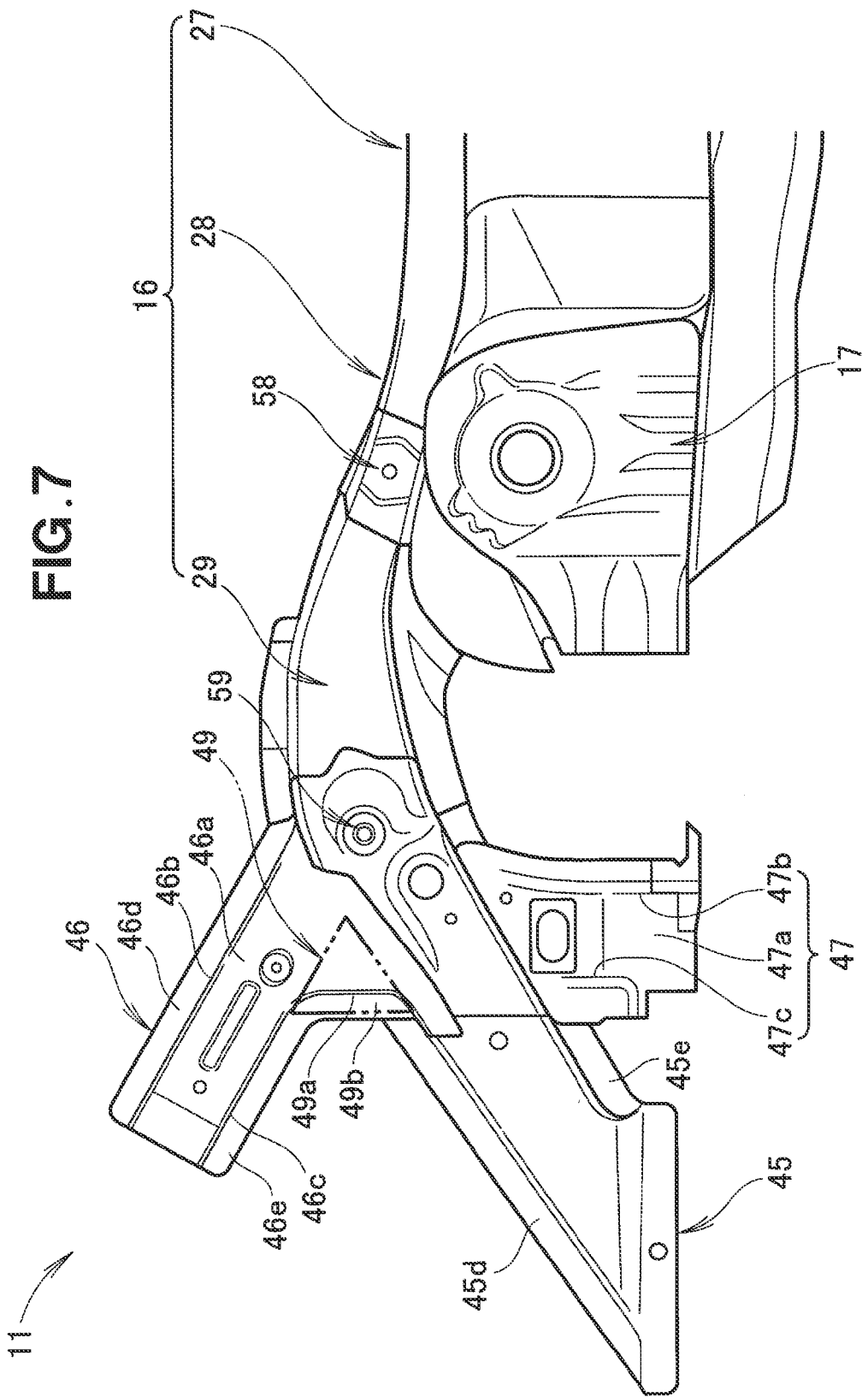
FIG. 7 is a bottom view showing the front side frame with the sub frame of FIG. 6 removed therefrom.

Further, as shown in FIGS. 6, 8 and 12, the instant embodiment also includes the load support portion (load receiving portion) 49 of a triangular shape disposed behind the branch portion 48 and connecting between the side-sill-side extension 45 and the tunnel-side extension 46. The load support portion 49 is formed integrally with the tunnel-side extension 46, and the load support portion 49 comprises a part of the bottom 46a of the tunnel-side extension 46, the rear wall 49a and the rear flange 49b. As noted above, the rear wall 49a extends in the vehicle width direction and projects substantially vertically in a height direction of the vehicle body. The above-mentioned part of the bottom portion 46a of the tunnel-side extension 46 is a triangular region of the bottom portion 46a of the tunnel-side extension 46 extending to the side-sill-side extension 45.

Figure 2:
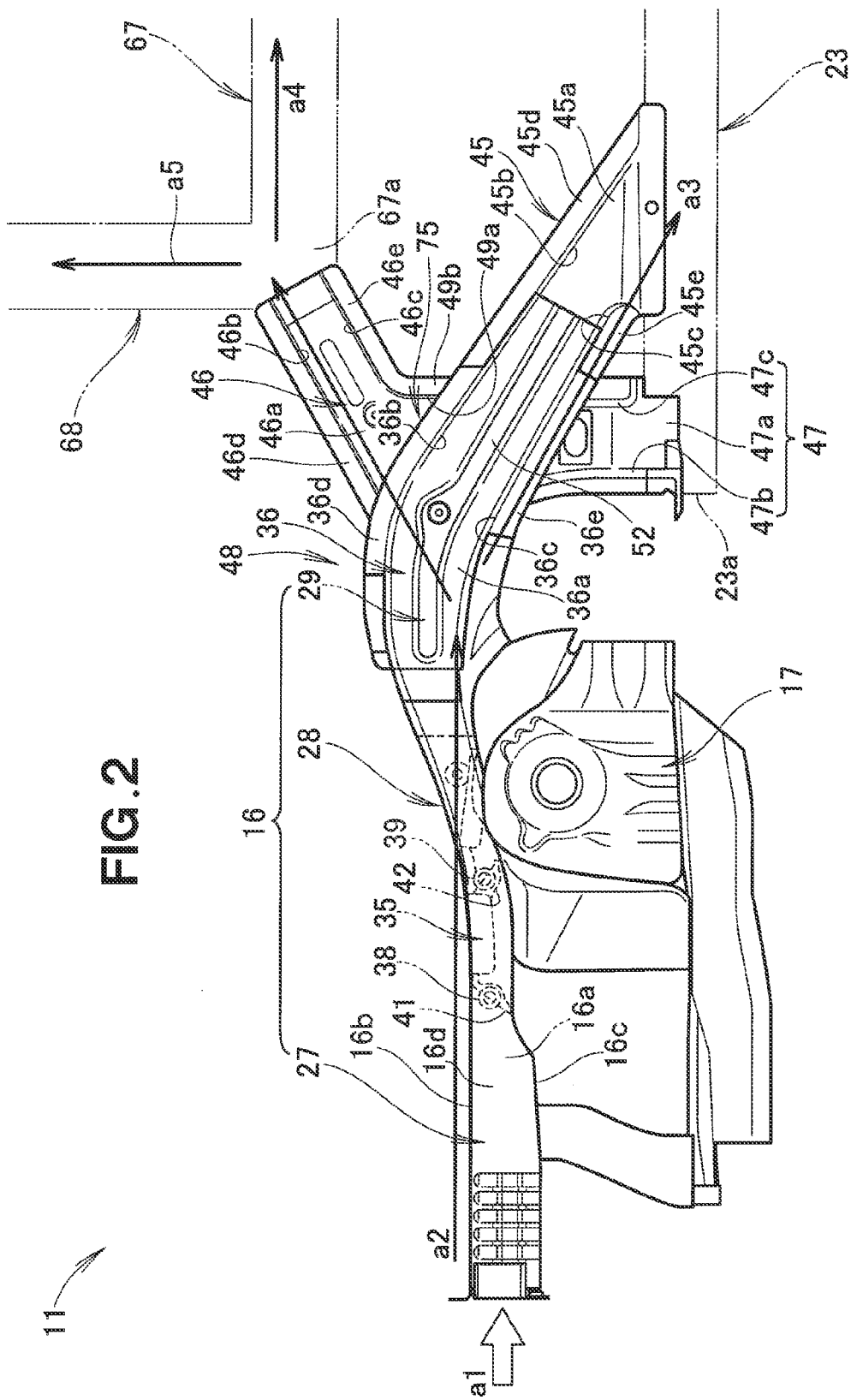
FIG. 2 is a plan view showing a left side section of the front vehicle body structure shown in FIG. 1.

Further, as shown in FIG. 2, a frontal collision load acting from the front of the vehicle body as indicated by arrow a1 is transmitted straight from the inner wall 16b of the front side frame 16 to the outer wall 16c of the front side frame 16 by way of the reinforcing member 35 as indicated by arrow a2. The load having been transmitted straight as above is branched via the branch portion 48 so that it is transmitted to the side sill 23 by way of the side-sill-side extension 45 and stiffener 36 as indicated by arrow a3, transmitted to a tunnel frame 67 by way of the stiffener 36 and tunnel-side extension 46 as indicated by arrow a4 and transmitted to the side sill 23 and tunnel frame 67 on the other side of the vehicle body by way of a tunnel cross member 68 as indicated by arrow a5.

Because a rear portion 69 (FIG. 9) of the reinforcing member 35 is opposed to the front portion 71 (FIG. 9) of the stiffener 36, the load can be readily transmitted straight from the inner wall 16b of the front side frame 16 to the outer wall 16c of the front side frame 16 by way of the reinforcing member 35 as indicated by arrow a2 (FIGS. 9 to 11).

Further, as shown in FIGS. 2 and 5, a lateral collision load acting from a lateral side of the vehicle body as indicated by arrow b1 can be transmitted from the side sill 23 to the rear wall 47c of the outrigger 47 as indicated by arrow b2, transmitted to the tunnel-side extension 46 by way of the rear wall 49a of the load support portion 49 (FIG. 6) as indicated by arrow b3, dispersed to the load support portion 49 and outrigger 47 on the other side of the vehicle body as indicated by arrow b5 by way of the tunnel cross member 68 as indicated by arrow b4, and dispersed to the side-sill-side extension 45 on the other side of the vehicle body as indicated by arrow b6.

The side-sill-side extension 45 is reinforced with the stiffener 36 and thereby allows a great load to be transmitted to the side sill 23 of a high strength, and the tunnel-side extension 46 has a lower strength than the side-sill-side extension 45. Thus, a frontal collision load can be transmitted primarily to the high-strength side sill 23. Therefore, the vehicle body 11 can be reduced in weight by the tunnel frame 67 of the tunnel portion 24 being made thinner or dispensed with.

Further, as shown in FIGS. 1, 8, 14, 15 and 18, the sub frame mount bracket 61 supporting the sub frame 18 is provided on the branch portion 48. Upper and lower portions of the collar nut 63 (FIG. 18), to which a fastening member 62 of the sub frame 18 is joined, are supported by the sub frame mount bracket 61 and the stiffener 36. More specifically, the lower portion of the collar nut 63 is supported by the sub frame mount bracket 61, while the upper portion of the collar nut 63 is supported by the stiffener 36.

The sub frame mount bracket 61, the stiffener 36 and the collar nut 63 together constitute the rear end support portion 59 (FIG. 8) supporting the rear end 18b of the sub frame 18. Further, a front end support portion 58 (FIG. 5) supporting the front end 18a of the sub frame 18 is formed on the sub frame mount bracket 61 in front of the rear end support portion 59. Namely, the rear end support portion 59 supporting the rear end 18b (FIG. 1) of the sub frame 18 is provided on the bend portion 29 in front of the load support portion 49 (FIGS. 6 and 8).

Further, as shown in FIGS. 3 and 19 to 22, the reinforcing member 35 is provided on the curve portion 28 to extend from front to rear of the curve portion 28. In a range from a front region to a middle region of the curve portion 28, the reinforcing member 35 is joined to the inner wall 16b of the curve portion 28 (front side frame 16), while, in a rear region of the curve portion 28, the reinforcing member 35 is joined to the outer wall 16c of the curve portion 28. Also, the bulkheads (first and second bulkheads) 41 and 42 fixing the nut members (first and second bulkheads) 38 and 39 for supporting the power unit 19 (FIG. 1) are joined to the curve portion 28.

Further, as shown FIGS. 9 to 11, the reinforcing member 35 includes: a bottom wall 64 of a U sectional shape extending in the front-rear direction of the vehicle body; first and second upper flanges 35a and 35b bent generally horizontally from upper portions of the bottom wall 64; and first and second lower flanges 35c and 35d bent generally horizontally from lower portions of the bottom wall 64. The bottom wall 64 of a U sectional shape has the bead 65 formed thereon to extend, in the front-rear direction of the vehicle body.

Further, as shown in FIGS. 2 and, 9 to 11, the deformation facilitating portion 32 (FIG. 3) that permits bending of the front side frame 16 to increase an amount of energy absorption is provided on the inner wall 16b of the curb portion 28 (front side frame 16) behind the bulkhead 42. The reinforcing member 35 of a U sectional shape has no flange on its part positionally corresponding to the deformation facilitating portion 32. Thus, the first and second upper flanges 35a and 35b are formed discontinuously with each other, and the first and second lower flanges 35c and 35d are formed discontinuously.

Further, as shown in FIGS. 19 to 22, the deformation facilitating portion 32 is recessed, by a width t1 at the maximum, from the inner surface of a rear region, in the front-rear direction, of the inner wall 16b of the curb portion 28. Thus, when a frontal collision load has acted from the front of the vehicle body, the load can concentrate on the deformation facilitating portion 32 more easily than on regions of the curb portion 28 in front of and behind the deformation facilitating portion 32.

Because the deformation facilitating portion 32 is provided by forming a recessed portion the inner wall 16b of the front side frame 16 beneath the front-frame-side bead 74, a ridgeline 76 is bent locally so that stress can concentrate on the recessed portion (deformation facilitating portion) 32. Further, because only one ridgeline 76 has to be deformed, there is only a little variation in the sectional area of the front side frame 16. Therefore, the overall strength of the front side frame 16 would not decrease.

The deformation facilitating portion 32 is where the front side frame 16 can be mountain-folded outwardly in the vehicle width direction away from the power unit 19 (FIG. 1). More specifically, the deformation facilitating portion 32 is the recessed portion (second recessed portion 32) formed in the inner wall 16b in a region where the front side frame 16 decreases in sectional width as viewed in plan. Further, the deformation facilitating portion 32 is formed in a position where the reinforcing member 35 of a U sectional shape breaks off.

Further, as shown in FIGS. 2, 12 and 13, the outrigger 47, which is a member extending in the vehicle width direction, a bottom portion 47a disposed along the floor panel 22, and front and rear walls 47a and 47c projecting upward in the height direction of the vehicle body. The outrigger 47 extends in the vehicle width direction from near a rear portion (bend portion 29) of the front side frame 16 and is joined to the front end 23a of the side sill 23.

Further, as shown in FIGS. 4 and 5, the tunnel portion 24 includes: a center tunnel 66 formed by a central region of the floor panel 22 being upraised or protruded upward toward the passenger compartment 12; the tunnel frames 67 provided on the left and right sides of the center tunnel 66 and extending in the front-rear direction of the vehicle body; and the tunnel cross member 68 connecting between the front ends 67a of the tunnel frames 67 or between the rear ends 73 (FIG. 10) of the left and right tunnel-side extensions 46. The tunnel cross member 68 is formed along a convex shape of the upwardly-protruded center tunnel 66.

The instant embodiment of the front vehicle body structure, as shown in FIGS. 1 to 5 and 14, includes: the front side frames 16 extending in the front-rear direction of the vehicle body; the lower dashboard panel 21 provided on rear portions of the side frames 16 and partitioning between the engine room 13 and the passenger compartment 12; the sub frame 18 supported by the front side frames 16; the side sills 23 provided on the left and right sides of the floor panel 22 and extending in the front-rear direction; and the tunnel portion 24 provided on a middle region, in the vehicle width direction, of the floor panel and extending from the lower dashboard panel 21 toward the rear of the vehicle body. Each of the front side frames 16 has, on its rear region, the bend portion 29 sloping downward, along the lower dashboard panel 21, toward the rear of the vehicle body. From the rear end part 29a of the bend portion 29, the side-sill-side extension 45 having a closed section bent continuously toward the side sill 23 and the tunnel-side extension 45 bent from the inner wall 45b of the closed section toward the tunnel portion 24 branch at generally equal angles to thereby constitute the branch portion 48. Thus, at the time of a frontal collision, a collision load applied from the side frames 16 can be transmitted preferentially to the high-strength side sills 23 each formed, for example, of a high-strength steel plate. Such arrangements can reduce a need for reinforcing structures beneath the floor panel 22 and allows the input load to be dispersed to the tunnel portion 24 as well.

Further, as shown in FIGS. 1, 8 and 14, the load support portion 49 of a triangular shape connecting between the side-sill-side extension 45 and the tunnel-side extension 46 is formed behind the branch portion 48, and the rear end support portion 59 supporting the rear ends 18b of the sub frame 18 is provided on the bend portion 29 in front of the load support portion 49. Such arrangements allow the load support portion 49 to receive a frontal collision load and to promote a directional change of the load to the side-sill-side extension 45 and the tunnel-side extension 46 such that the load can be transmitted along the respective axes of the side-sill-side extension 45 and tunnel-side extension 46.

Because the rear end support portion 59 supporting the rear end 18b of the sub frame 18 is provided in front of the load support portion 49, the sub frame 18 can be supported firmly. As a result, when a frontal collision load has acted on the front side frame 16 from the front of the vehicle body, the branch portion 48 and the load support portion 49 can receive the frontal collision load and generate a reactive force to the sub frame 18, and thus, the sub frame 18 is caused to sufficiently buckle and deform so that an amount of energy absorption by the front side frame 16 can be increased. If the sub frame 18 has a high strength and rigidity, buckling and deformation of the front side frame 16 can be promoted to effectively absorb impact energy by causing stress to concentrate on the rear end support portion 59 so that the fastening members (fastening bolts) 62 are broken or pulled out to cause detachment of the sub frame 18. Thus, even with a small-size vehicle, which has a relatively wide passenger compartment (cabin) 12 with the engine room 13 disposed in front of the passenger compartment reduced in its front-rear length, the instant embodiment can achieve a sufficient collision performance.

Further, in the instant embodiment of the front vehicle body structure, as shown in FIGS. 6, 12 and 14, the sub frame mount bracket 61 supporting the sub frame 18 is provided on the branch portion 48. The stiffer 36, extending from the bend portion 29 to the branch portion 48, serves to suppress bending of the bend portion 29 when a frontal collision has acted on the front side frame 16 and serves to transmit a lateral collision load to the tunnel-side extension 46 when the lateral collision load has acted on the front side frame 16 from a lateral side of the vehicle body.

Figure 18:
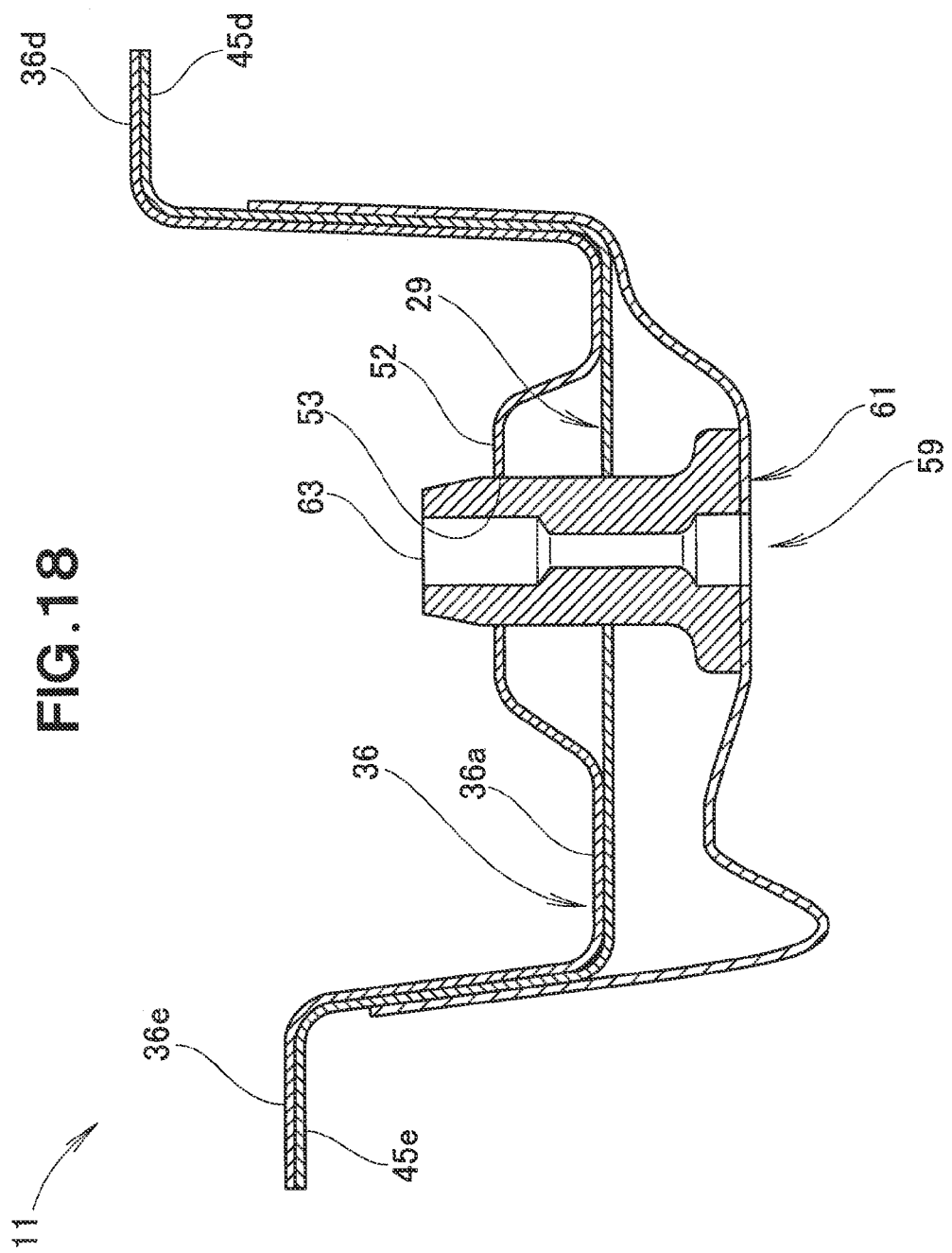
FIG. 18 is a sectional view taken along line 18-18 of FIG. 12.
Figure 19:
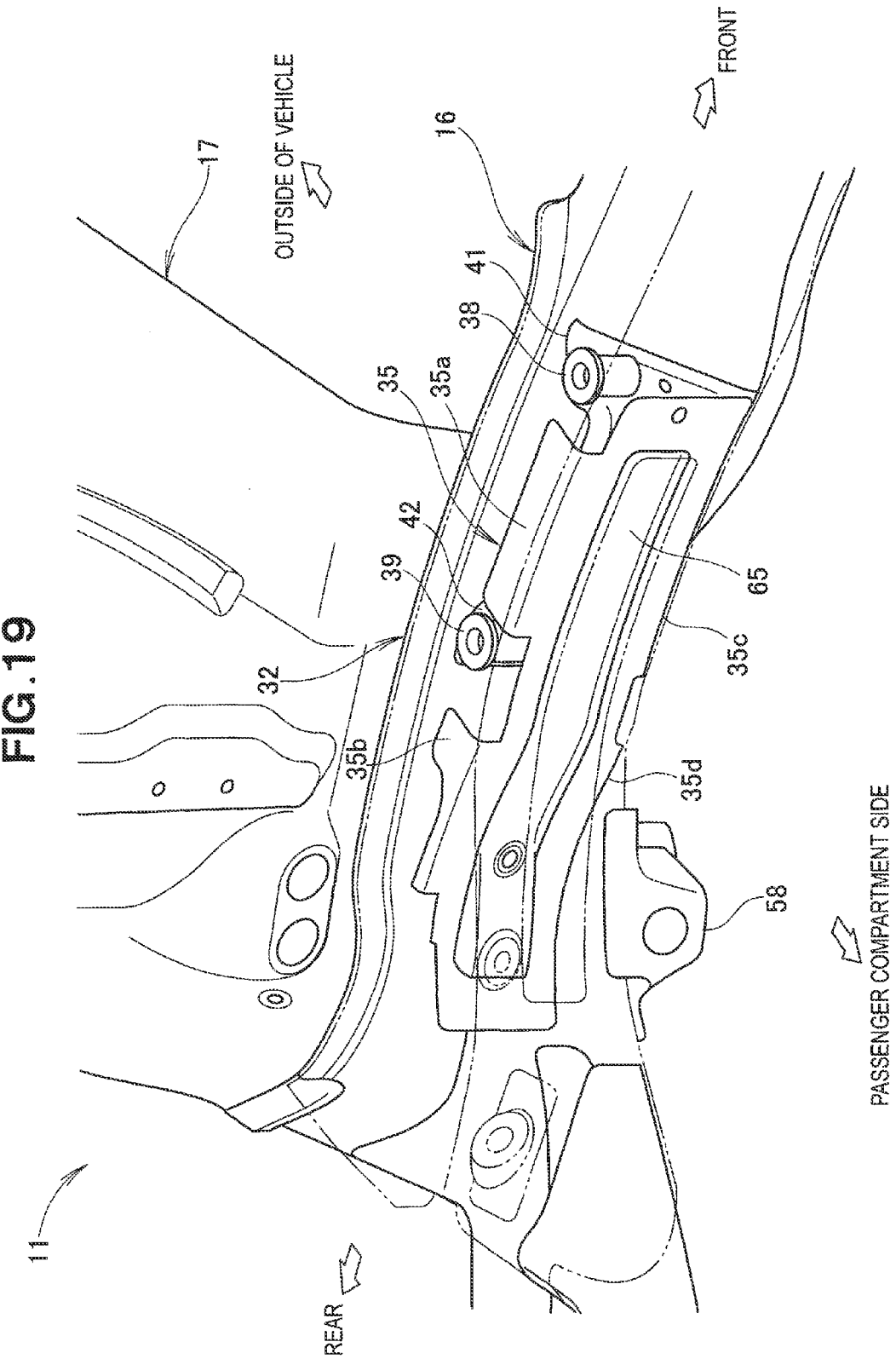
FIG. 19 is a perspective view showing the front side frame and the reinforcing member shown in FIG. 11.

Further, as shown in FIGS. 1, 2 and 18, the upper and lower portions of the collar nut 63, to which the fastening member 62 of the sub frame 18 is joined, are supported by the stiffener 36 and the sub frame mount bracket 61, respectively. Thus, a load from the sub frame 18 can be dispersed uniformly to the side sill 23 and the tunnel portion 24 via the stiffener 36, and a load from the front side frame 16 can be dispersed uniformly to the side sill 23 and the tunnel portion 24.

As shown in FIGS. 1 and 12, the stiffener 36 is jointed at its front portion 71 to the bottom portion 16a of the bend portion 29 (front side frame 16) and joined at its rear portion 72 to the flanges 46d and 46e of the tunnel-side extension 46 via the flanges 45d and 45e of the side-sill-side extension 45. Thus, a load from the front side frame and a load from the sub frame 18 can be readily dispersed to the side-sill-side extension 45 and the tunnel-side extension 46.

Further, in the instant embodiment of the front vehicle body structure, as shown in FIG. 2, the stiffener 36 has the longitudinal bead 52 provided on its middle region and extending in a longitudinal direction thereof, and thus, the stiffener 36 can not only prevent bending of the bend portion 29 of the front side frame 16 but also disperse a load. in the front-rear direction of the front side frame 16.

Further, as shown FIGS. 2 and 6, the outrigger 47 extending from the branch portion 48 outward in the width direction is joined to the side sill 23. Thus, when a lateral collision load has acted from a lateral side of the vehicle body 11, the lateral collision load can be dispersed from the side sill 23 to the branch portion 48 via the outrigger 47. Further, because the outrigger 47 extending from the branch portion 48 outward in the vehicle width direction is joined to the side sill 23, the instant embodiment can increase a supported strength of the sub frame 18.

Further, as shown in FIGS. 14 and 15, the peripheral region of the branch portion 48 has a greater sectional area than the bend portion 29, side-sill-side extension 45 and tunnel-side extension 46 of the front side frame 16, the instant embodiment can increase a load bearing strength of the branch portion 48. Thus, when a frontal collision load has acted on the front side frame 16 from the front of the vehicle body, the instant embodiment can also suppress bending of the bend portion (kick-down portion) 29.

As shown in FIGS. 3, 10 and 12, the front side frame 16 includes the curve portion 28 extends in the front-to-rear direction while curving inward (i.e., from an outer side to an inner side) in the vehicle width direction, the reinforcing member 35 provided on the curve portion 28 to extend in the front-to-rear direction of the curve portion 28, and the stiffener 36 is disposed in opposed relation to the reinforcing member 35. Thus, when a frontal collision load has acted from the front of the vehicle body, the instant embodiment can transmit the frontal collision load to the side sill 23 while suppressing bending of the curve portion 28 due to the frontal collision load. In this way, the instant embodiment can achieve an increased load transmission efficiency of the front side frame 16.

Whereas FIG. 10 shows an example where the reinforcing member 35 in the instant embodiment has a rear portion opposed to the front portion 71 of the stiffener 36, the present invention is not so limited, and the reinforcing member 35 and the stiffener 36 are joined directly to each other.

As shown in FIGS. 1 to 5, the instant embodiment of the front vehicle body structure includes: the front side frame 16 extend in the front-rear direction of the vehicle body; the lower dashboard panel 21 provided on a rear portion of the side frame 16 and partitioning between the engine room 13 and the passenger compartment 12; the floor panel 22 provided rearward of the lower dashboard panel 21; the side sill 23 provided along a side edge of the lower dashboard panel 21; and the tunnel portion 24 provided on a middle region, in the vehicle width direction, of the floor panel 22 and extending from the lower dashboard panel 21 in the front-rear direction of the vehicle body.

As shown in FIGS. 2, 8 and 15, the front side frame 16 has, in its rear region, the bend portion (kick-down portion) 29 sloping downward along the dashboard panel 21 in the direction toward the rear of the vehicle body and having the rear end 29a (FIG. 7) extending horizontally.

The branch portion 48 is provided on the rear end part 29a of the bend portion 29, where the side-sill-side extension 45 bent continuously toward the side sill 23 and the tunnel-side extension 45 bent toward the tunnel portion 24 (FIG. 4) branch at generally equal angles.

The stiffener 36, which is provided to extend from the bend portion 29 to the branch portion 48, serves to not only suppress bending of the bend portion 29 when a frontal collision load has acted on the front side frame 16 from the front of the vehicle body 11, but also transmit a lateral collision load to the outrigger 47 and the tunnel-side extension 46 when the lateral collision load has acted on the front side frame 16 from a lateral side of the vehicle body. Thus, the instant embodiment can suppress bending of a rear portion of the front side frame 16 and transmit a lateral collision load to the outrigger 47 and the tunnel-side extension 46. Further, in the case where the tunnel frames 67 (FIG. 4) and the tunnel cross member 68 (FIG. 4) are provided on the tunnel portion 24, the load can be dispersedly transmitted to the tunnel frames 67 and the tunnel cross member 68.

Further, in the instant embodiment of the front vehicle body structure, as shown in FIGS. 4 and 8, the load support portion 49 of a triangular shape connecting between the side-sill-side extension 45 and the tunnel-side extension 46 is provided behind the branch portion 48, and thus, a frontal collision load can be dispersedly transmitted via the triangular load support portion 49 to the tunnel portion 24 (tunnel frames 67 and tunnel cross member 68).

Furthermore, as shown in FIGS. 8 and 12, the stiffener 36 has the stepped portion 51 connecting to the rear wall 47c of the outrigger 47 and rear wall 49a of the load support portion 49. Via such a stepped portion 51 connecting to the rear wall 47c of the outrigger 47 and rear wall 49a of the load support portion 49, the instant embodiment of the front vehicle body structure permits even more efficient dispersed transmission of a load to the tunnel portion 24 (tunnel frames 67 and tunnel cross member 68) shown in FIG. 4.

Furthermore, as shown in FIGS. 5 and 12, the tunnel portion 24 includes: the center tunnel 66 formed by the central region of the floor panel 22 being upraised or protruded upward toward the passenger compartment 12; the tunnel frames 67 provided on the left and right sides of the center tunnel 66 and extending in the front-rear direction of the vehicle body; and the tunnel cross member 68 connecting between the front ends 67a of the tunnel frames 67 or between the rear ends 73 of the left and right tunnel-side extensions 46.

By the provision of the tunnel cross member 68 connecting between the front ends 67a of the tunnel frames 67 or between the rear ends 73 of the left and right tunnel-side extensions 46, the instant embodiment can dispersedly transmit a load from the tunnel-side extension 46 from one side of the vehicle body 11 to the other side of the vehicle body 11.

Furthermore, as shown in FIGS. 2 and 12, the stiffener 36 is jointed at its front portion 71 to the bottom portion 16a of the bend portion 29 (front side frame 16) and joined at its rear portion 72 to the flanges 46d and 46e of the tunnel-side extension 46 via the flanges 45d and 45e of the side-sill-side extension 45. Thus, a load from the front side frame or the sub frame 18 can be readily dispersed to the side-sill-side extension 45 and the tunnel-side extension 46.

Furthermore, as shown in FIG. 12, the stiffener 36 in the instant embodiment of the front vehicle body section has the bead 52 provided on its middle region and extending in the longitudinal direction thereof, and thus, the instant embodiment can not only prevent bending of the bend portion 29 of the front side frame 16 but also disperse a load in the front-rear direction of the front side frame 16.

Furthermore, as shown in FIGS. 5, 8 and 14, the outrigger 47 extending from the branch portion 48 outward in the vehicle width direction is joined to the side sill 23. Thus, when a lateral collision load has acted from a lateral side of the vehicle body 11, the lateral collision load can be dispersed from the side sill 23 to the branch portion 48 via the outrigger 47. Further, because the outrigger 47 extending from the branch portion 48 outward in the vehicle width direction is joined to the side sill 23, the instant embodiment can increase a supported strength of the sub frame 18.

Further, as shown in FIGS. 14 and 15, the peripheral region of the branch portion 48 has a greater sectional area than each of the bend portion 29, side-sill-side extension 45 and tunnel-side extension 46 of the front side frame 16, the instant embodiment can increase a load bearing strength of the branch portion 48. Thus, when a frontal collision load has acted on the front side frame 16 from the front of the vehicle body, the instant embodiment can suppress bending of the bend portion (kick-down portion) 29.

Furthermore, as shown in FIGS. 3, 10 and 12, the front side frame 16 includes the curve portion 28 extends in the front-to-rear direction while curving inward (i.e., from an outer side toward an inner side) in the vehicle width direction, the reinforcing member 35 provided on the curve portion 28 to extend in the front-to-rear direction of the curve portion 28, and the stiffener 36 is disposed in opposed relation to the reinforcing member 35. Thus, when a frontal collision load has acted from the front of the vehicle body, the instant embodiment can transmit the frontal collision load to the side sill 23 while suppressing bending of the curve portion 28 due to the frontal collision load. In this way, the instant embodiment can achieve an increased load transmission efficiency of the front side frame 16.

INDUSTRIAL APPLICABILITY

The front vehicle body structure of the present invention is well suited for application to passenger vehicles, such as sedans and wagons, and particularly small-size vehicles.

LEGEND

11 . . . vehicle body, 12 . . . passenger compartment, 13 . . . engine room, 16 . . . front side frame, 16a . . . bottom portion, 16b . . . inner wall, 16c . . . outer wall, 18 . . . sub frame, 18b . . . rear end, 21 . . . lower dashboard panel, 22 . . . floor panel, 23 . . . side sill, 24 . . . tunnel portion, 28 . . . curve portion, 29 . . . bent portion, 29a . . . rear end part of bend portion, 35 . . . reinforcing member, 36 . . . stiffener, 45 . . . side-sill-side extension, 45d, 45e . . . flanges of side-sill-side extension, 46 . . . tunnel-side extension, 46d, 46e . . . (inner and outer) flanges of tunnel-side extension, 47 . . . outrigger, 47c . . . rear wall of outrigger, 48 . . . branch portion, 49 . . . load support portion, 49a . . . rear wall of load support portion, 51 . . . stepped portion of stiffener, 52 . . . bead of stiffener, 59 . . . rear end support portion, 61 . . . sub frame mount bracket, 62 . . . fastening member, 63 . . . collar nut, 66 . . . center tunnel, 67 . . . tunnel frame, 67a . . . front end, 68 . . . tunnel cross member, 71 . . . front portion of stiffener, 72 . . . rear portion of stiffener, 73 . . . rear end of tunnel-side extension

The invention claimed is:

1. A front vehicle body structure comprising:
a front side frame extending in a front-rear direction of the vehicle body;
a lower dashboard panel provided on a rear portion of the front side frame and partitioning between an engine room and a passenger compartment;
a sub frame supported by the front side frame;
a side sill extending in the front-rear direction of the vehicle body along a side edge of a floor panel provided behind the lower dashboard panel; and
a tunnel portion provided on a middle region, in a vehicle width direction, of the floor panel and extending from the lower dashboard panel in the front-rear direction of the vehicle body,
the front side frame having, in a rear region thereof, a bend portion sloping downward, along the lower dashboard panel, in a direction toward a rear of the vehicle body,
the bend portion having, in a rear region thereof, a branch portion where a side-sill-side extension curved toward the side sill and a tunnel-side extension bent toward the tunnel portion are branched at substantially equal angles,
a load support portion of a triangular shape being formed rearwardly, in the front-rear direction of the vehicle body relative to the branch portion and between the side-sill-side extension and the tunnel-side extension, a rear end support portion being provided on the bend portion in front of the load support portion for supporting a rear end of the sub frame.

2. The front vehicle body structure according to claim 1, further comprising:
a sub frame mount bracket provided on the branch portion for supporting the sub frame; and
a stiffener provided to extend from the bend portion to the branch portion in such a manner that, when a frontal collision load has acted on the front side frame from a front of the vehicle body, the stiffener suppresses bending of the bend portion, and that, when a lateral collision load has acted on the front side frame from a lateral side of the vehicle body, the stiffener transmits the lateral collision load to the tunnel-side extension,
wherein upper and lower portions of a collar nut, to which a fastening member of the sub frame is joined, are supported by the sub frame mount bracket and the stiffener.

3. The front vehicle body structure according to claim 2, wherein the stiffener has: a front portion joined to a bottom of the bend portion; and a rear portion joined to a flange of the tunnel-side extension via a flange of the side-sill-side extension.

4. The front vehicle body structure according to claim 2, wherein the stiffener has a longitudinal bead formed on and along a middle region thereof.

5. The front vehicle body structure according to claim 1, wherein the side sill is joined to an outrigger extending from the branch portion outward in the vehicle width direction.

6. The front vehicle body structure according to claim 1, wherein a peripheral region of the branch portion has a greater sectional area than each of the bend portion, the side-sill-side extension and the tunnel-side extension of the front side frame.

7. The front vehicle body structure according to claim 2, wherein the front side frame has a curve portion curved from an outer side toward an inner side thereof in the vehicle width direction, and the curve portion includes a reinforcing member provided thereon to extend from front to rear thereof, and the stiffener is disposed in opposed relation to the reinforcing member.

8. The front vehicle body structure according to claim 1, wherein the branch portion includes an outrigger extending outward in the vehicle width direction, and wherein the structure further comprises a stiffener provided to extend from the bend portion to the branch portion in such that, when a frontal collision load has acted on the front sub frame from frontward of the vehicle body, the stiffener suppresses bending of the bend portion, and such that, when a lateral collision load has acted on the front side frame from a lateral side of the vehicle body, the stiffener transmits the lateral collision load to the outrigger and the tunnel-side extension.

9. The front vehicle body structure according to claim 8, wherein the stiffener has a stepped portion connecting to a rear wall of the outrigger and to a rear wall of the load support portion.

10. The front vehicle body structure according to claim 8, wherein the tunnel portion includes: a center tunnel formed by a central region of the floor panel being protruded upward toward the passenger compartment; tunnel frames provided on left and right sides of the center tunnel and extending in the front-rear direction of the vehicle body; and a tunnel cross member connecting between front ends of the tunnel frames or between rear ends of the tunnel-side extensions provided on left and right sides of the vehicle body.

11. The front vehicle body structure according to claim 8, wherein the stiffener has: a front portion joined to a bottom of the bend portion; and a rear portion joined to a flange of the tunnel-side extension via a flange of the side-sill-side extension.

12. The front vehicle body structure according to claim 8, wherein the stiffener has a longitudinal bead formed on and along a middle region thereof.

13. The front vehicle body structure according to claim 8, wherein the side sill is joined to the outrigger extending from the branch portion outward in the vehicle width direction.

14. The front vehicle body structure according to claim 8, wherein a peripheral region of the branch portion has a greater sectional area than each of the bend portion, the side-sill-side extension and the tunnel-side extension of the front side frame.

15. The front vehicle body structure according to claim 8, wherein the front side frame has a curve portion curved from an outer side to an inner side thereof in the vehicle width direction, and the curve portion includes a reinforcing member provided thereon to extend from front to rear thereof, and the stiffener is disposed in opposed relation to the reinforcing member.

* * * * *